(12) United States Patent
Lamb

(10) Patent No.: US 9,093,788 B2
(45) Date of Patent: Jul. 28, 2015

(54) POWER SUPPLY SYSTEM INCLUDING PANEL WITH SAFETY RELEASE

(71) Applicant: Atlantic Great Dane, Inc., South Portland, ME (US)

(72) Inventor: Scott D Lamb, Standish, ME (US)

(73) Assignee: Atlantic Great Dane, Inc., South Portland, ME (US)

( * ) Notice: Subject to any disclaimer, the term of this patent is extended or adjusted under 35 U.S.C. 154(b) by 0 days.

(21) Appl. No.: 14/320,126

(22) Filed: Jun. 30, 2014

(65) Prior Publication Data

US 2014/0335711 A1 Nov. 13, 2014

Related U.S. Application Data

(63) Continuation-in-part of application No. 13/759,432, filed on Feb. 5, 2013, now Pat. No. 8,764,469, which is a continuation-in-part of application No. 13/631,294, filed on Sep. 28, 2012, now abandoned.

(60) Provisional application No. 61/752,044, filed on Jan. 14, 2013.

(51) Int. Cl.
*H01R 13/62* (2006.01)
*H01R 13/633* (2006.01)
(Continued)

(52) U.S. Cl.
CPC .......... *H01R 13/633* (2013.01); *B60D 1/64* (2013.01); *B60L 3/04* (2013.01); *B60L 11/18* (2013.01); *H02J 7/00* (2013.01); *H01R 13/6275* (2013.01); *H01R 2201/26* (2013.01)

(58) Field of Classification Search
CPC .............................. Y02T 90/14; H01R 13/625
USPC ................... 439/35, 258, 152, 923, 474, 352; 320/109
See application file for complete search history.

(56) References Cited

U.S. PATENT DOCUMENTS 706,927 A * 8/1902 Goodrich ...................... 439/451
2,158,385 A 5/1939 Schwien
(Continued)

FOREIGN PATENT DOCUMENTS

EP 2128545 12/2009
RU 2002125735 3/2004
(Continued)

OTHER PUBLICATIONS

International Search Report and Written Opinion in corresponding PCT application PCT/US2013/061616, Feb. 6, 2014, 7 pp.
(Continued)

*Primary Examiner* — Neil Abrams
(74) *Attorney, Agent, or Firm* — Caseiro Burke LLC; Chris A. Caseiro

(57) ABSTRACT

A power supply system for use with a power source. The system includes one or more power supply connections and an optional configuration with one or more remote control panels spaced from a safety circuit panel. The safety circuit panel includes a safety circuit. The system further includes a power cable with a safety ejector subsystem. The safety ejector subsystem includes a latch connected to the wall receptacle connector of the power cable and a tension line connected to the latch and to the power cable. When the power cable is placed in tension, such as when the power cable has not been disconnected from the wall receptacle in the ordinary way, the safety ejector subsystem forces the disconnection of the power cable from a plug, thereby ensuring that no live wiring is exposed to the environment.

20 Claims, 27 Drawing Sheets

(51) Int. Cl.
  *B60D 1/64* (2006.01)
  *B60L 11/18* (2006.01)
  *B60L 3/04* (2006.01)
  *H02J 7/00* (2006.01)
  *H01R 13/627* (2006.01)

(56) References Cited

U.S. PATENT DOCUMENTS

| | | | | |
|---|---|---|---|---|
| 2,235,262 A * | 3/1941 | Miller | | 439/34 |
| 2,394,618 A * | 2/1946 | Kunasch | | 439/159 |
| 2,510,125 A | 6/1950 | Meakin | | |
| 2,621,875 A * | 12/1952 | Darling | | 244/122 A |
| 2,660,715 A * | 11/1953 | Glass et al. | | 439/484 |
| 2,710,384 A * | 6/1955 | Dupre et al. | | 439/155 |
| 2,723,380 A * | 11/1955 | Howard | | 439/34 |
| 2,761,111 A | 8/1956 | Klostermann | | |
| 2,933,711 A * | 4/1960 | Eaton | | 439/316 |
| 2,986,719 A | 5/1961 | Adams | | |
| 3,008,115 A * | 11/1961 | Oakes | | 439/160 |
| 3,189,212 A * | 6/1965 | Bellek | | 220/3.3 |
| 3,270,267 A | 8/1966 | Nolte, Jr. | | 320/138 |
| 3,431,428 A * | 3/1969 | Van Valer | | 307/10.1 |
| 3,452,167 A | 6/1969 | Fee | | |
| 3,496,500 A | 2/1970 | Romary | | |
| 3,598,941 A | 8/1971 | Nelson | | |
| 3,641,473 A * | 2/1972 | Attaway | | 439/108 |
| 3,760,134 A | 9/1973 | McCray | | |
| 3,843,854 A | 10/1974 | Mori et al. | | |
| 3,915,476 A | 10/1975 | Burkle | | |
| 3,933,404 A * | 1/1976 | Oehlerking et al. | | 439/188 |
| 3,936,123 A * | 2/1976 | Gossett et al. | | 439/155 |
| 4,045,106 A * | 8/1977 | Borg | | 439/152 |
| 4,052,655 A | 10/1977 | Vizza | | |
| 4,077,690 A | 3/1978 | Koether | | |
| 4,109,989 A * | 8/1978 | Snyder et al. | | 439/140 |
| 4,138,177 A * | 2/1979 | Van Valer | | 439/4 |
| 4,166,664 A * | 9/1979 | Herrmann, Jr. | | 439/258 |
| 4,314,735 A | 2/1982 | Fullenkamp et al. | | |
| 4,415,219 A * | 11/1983 | Kuhl et al. | | 439/694 |
| 4,546,418 A | 10/1985 | Baggio et al. | | |
| 4,550,967 A * | 11/1985 | Riches et al. | | 439/332 |
| 4,583,084 A * | 4/1986 | Henderson et al. | | 340/573.4 |
| 4,669,791 A | 6/1987 | Savill | | |
| 4,707,046 A * | 11/1987 | Strand | | 439/314 |
| 4,792,308 A | 12/1988 | Johnson | | |
| 4,842,532 A | 6/1989 | Krause | | |
| 5,024,604 A * | 6/1991 | Savin et al. | | 439/345 |
| 5,069,631 A * | 12/1991 | Bauer et al. | | 439/159 |
| 5,202,617 A * | 4/1993 | Nor | | 320/130 |
| 5,293,296 A | 3/1994 | Carl | | |
| 5,315,064 A | 5/1994 | Andrews | | |
| 5,344,330 A | 9/1994 | Hoffman | | |
| 5,344,331 A * | 9/1994 | Hoffman et al. | | 439/138 |
| 5,346,406 A | 9/1994 | Hoffman et al. | | |
| 5,427,542 A * | 6/1995 | Gerow | | 439/314 |
| 5,453,899 A * | 9/1995 | Page | | 361/1 |
| 5,462,452 A | 10/1995 | Devine | | |
| 5,478,119 A | 12/1995 | Dye | | |
| 5,478,250 A * | 12/1995 | Hoffman | | 439/142 |
| 5,486,117 A * | 1/1996 | Chang | | 439/357 |
| 5,545,046 A | 8/1996 | Masuda et al. | | |
| 5,596,258 A * | 1/1997 | Kimura et al. | | 320/163 |
| 5,752,847 A * | 5/1998 | McCormick | | 439/349 |
| 5,775,712 A | 7/1998 | Link et al. | | |
| 5,800,189 A * | 9/1998 | Ahmed | | 439/159 |
| 5,831,802 A | 11/1998 | Ahmed et al. | | |
| 5,915,987 A | 6/1999 | Reed et al. | | |
| 5,993,246 A * | 11/1999 | Moldenhauer et al. | | 439/474 |
| 6,039,602 A * | 3/2000 | Witkowski et al. | | 439/550 |
| 6,054,779 A | 4/2000 | Zubko | | |
| 6,266,233 B1 | 7/2001 | O'Regan | | |
| 6,364,675 B1 * | 4/2002 | Brauer et al. | | 439/159 |
| 6,450,833 B1 | 9/2002 | Brown, Jr. et al. | | |
| 6,461,185 B2 | 10/2002 | James | | |
| 6,558,167 B2 | 5/2003 | Harmon et al. | | |
| 6,765,787 B2 | 7/2004 | Beasley, III et al. | | |
| 6,767,218 B2 * | 7/2004 | Marmaropoulos | | 439/37 |
| 6,776,638 B2 * | 8/2004 | Thurston | | 439/312 |
| 7,044,759 B2 * | 5/2006 | Hughes | | 439/180 |
| 7,052,282 B2 * | 5/2006 | Meleck et al. | | 439/34 |
| 7,114,966 B2 * | 10/2006 | Cecchi | | 439/88 |
| 7,163,413 B2 * | 1/2007 | Murayama | | 439/258 |
| 7,195,512 B2 * | 3/2007 | Jenkinson et al. | | 439/372 |
| 7,241,146 B1 | 7/2007 | Kim et al. | | |
| 7,252,533 B1 * | 8/2007 | Lee | | 439/382 |
| 7,254,005 B2 * | 8/2007 | Oyama | | 361/220 |
| 7,344,393 B2 * | 3/2008 | Buller et al. | | 439/152 |
| 7,392,585 B2 * | 7/2008 | Ostendorp | | 29/857 |
| 7,431,601 B2 * | 10/2008 | Nugent et al. | | 439/188 |
| 7,484,689 B2 | 2/2009 | Musial et al. | | |
| 7,575,450 B2 | 8/2009 | Williams et al. | | |
| 7,585,179 B2 * | 9/2009 | Roberts | | 439/451 |
| 7,740,485 B1 | 6/2010 | Edwards, Jr. | | |
| 7,859,219 B2 | 12/2010 | Harris | | |
| 7,878,866 B1 * | 2/2011 | Kwasny et al. | | 439/695 |
| 7,887,332 B2 * | 2/2011 | Bauer et al. | | 439/13 |
| 8,172,600 B2 * | 5/2012 | Trottier et al. | | 439/392 |
| 8,206,184 B2 | 6/2012 | Kwasny et al. | | |
| 8,262,402 B2 * | 9/2012 | Gaul et al. | | 439/304 |
| 8,278,875 B2 | 10/2012 | Hagenmaier, Jr. et al. | | |
| 8,288,651 B2 | 10/2012 | Smith | | |
| 8,378,628 B2 | 2/2013 | Ichikawa et al. | | |
| 8,390,247 B1 * | 3/2013 | Harris et al. | | 320/104 |
| 8,410,369 B2 * | 4/2013 | Kim et al. | | 174/153 G |
| 8,535,071 B1 * | 9/2013 | Mueller | | 439/144 |
| 8,558,504 B2 | 10/2013 | Brown et al. | | |
| 8,565,930 B2 | 10/2013 | Miwa | | |
| 8,591,249 B2 * | 11/2013 | Harnish et al. | | 439/474 |
| 8,744,641 B2 * | 6/2014 | Ito | | 700/295 |
| 8,764,469 B2 * | 7/2014 | Lamb | | 439/258 |
| 2002/0064983 A1 | 5/2002 | Patey | | |
| 2003/0100206 A1 * | 5/2003 | Rosa et al. | | 439/135 |
| 2004/0142587 A1 | 7/2004 | Milan | | |
| 2007/0049098 A1 * | 3/2007 | Feinbloom et al. | | 439/349 |
| 2010/0144185 A1 * | 6/2010 | Donetsky | | 439/262 |
| 2010/0241299 A1 | 9/2010 | Ito et al. | | |
| 2011/0076874 A1 | 3/2011 | Fleisig | | |
| 2012/0104846 A1 | 5/2012 | Hurst et al. | | |
| 2012/0135634 A1 | 5/2012 | Gaul et al. | | |
| 2012/0187905 A1 | 7/2012 | Kanayama | | |
| 2012/0282798 A1 | 11/2012 | Oe et al. | | |
| 2012/0306444 A1 * | 12/2012 | Pham et al. | | 320/109 |
| 2012/0309214 A1 * | 12/2012 | Beluse | | 439/180 |
| 2012/0313580 A1 | 12/2012 | Charnesky | | |
| 2013/0015815 A1 | 1/2013 | Bianco | | |
| 2013/0187601 A1 | 7/2013 | Petrie et al. | | |
| 2014/0021915 A1 * | 1/2014 | Staley et al. | | 320/109 |

FOREIGN PATENT DOCUMENTS

| | | |
|---|---|---|
| RU | 2242069 | 12/2004 |
| RU | 2397585 | 8/2010 |

OTHER PUBLICATIONS

Statement regarding the availability of copies and translations of the non-English foreign references, Apr. 1, 2014, 2 pp.

* cited by examiner

POWER SUPPLY SYSTEM INCLUDING PANEL WITH SAFETY RELEASE

CROSS REFERENCE TO RELATED APPLICATIONS

This application is a continuation-in-part of, and claims a priority benefit to, U.S. patent application Ser. No. 13/759,432, filed Feb. 5, 2013, entitled POWER SUPPLY SYSTEM INCLUDING PANEL WITH SAFETY RELEASE, which issued as U.S. Pat. No. 8,764,469 on Jul. 1, 2014, which is a continuation-in-part of, and claims the priority benefit to, U.S. patent application Ser. No. 13/631,294, filed Sep. 28, 2012, entitled POWER SUPPLY SYSTEM INCLUDING PANEL WITH SAFETY RELEASE, which is a nonprovisional of, and claims a priority benefit to, U.S. provisional patent application Ser. No. 61/752,044, filed Jan. 14, 2013, entitled POWER SUPPLY SYSTEM INCLUDING PANEL WITH SAFETY RELEASE. The applications are owned by a common assignee. The priority applications are incorporated in their entirety herein by reference.

BACKGROUND OF THE INVENTION

1. Field of the Invention

The present invention relates power supply systems including supply panels. More particularly, the present invention relates to power supply systems accessible by a variety of power users including, but not limited to, mobile systems such as vehicles and other transportation equipment. Still more particularly, the present invention relates to power supply systems configured to ensure safe use and disengagement of a power cord from the power source.

2. Description of the Prior Art

There exists a wide range of different types of transportation equipment that require, or that would benefit, from the availability of a power source from other than one or more onboard batteries that are charged by one or more engines associated with the transportation equipment. One example is a boat tied up to a dock. The boat may have a refrigerator, heater or stove, for instance, all of which require power to operate. The boat owner can choose to run the boat's engine(s) to maintain a charge on one or more batteries suitable for supplying that power. Alternatively, the boat owner can connect a power cord or cords to a shore-power source to obtain that power.

Another example of a form of transportation equipment that consumes power is a refrigerated trailer. Refrigerated trailers are widely used to transport food and other items that require temperature-controlled storage to remain viable. These trailers are hauled by tractors and when they are in motion, the trailer's refrigeration unit has an engine that generates the power to supply the refrigeration system. However, when the trailer is stopped at its destination or a way station in the course of a trip, it is still necessary to continue running the refrigeration unit's diesel motor to generate the power to keep the load temperature controlled. This process is inefficient and uneconomical. It involves the consumption of valuable fossil fuels for a vehicle that is not in motion and it unnecessarily generates harmful emissions.

At least one attempt at resolving this problem has been implemented in an experimental way. The New York State Energy Research and Development Authority (NYSERDA), in conjunction with the United States Environmental Protection Agency and the United States Department of Energy, among others, has established a project to reduce diesel consumption associated with refrigerated trailers. The project involves the provision of power sources at locations where such trailers may be at rest. The power sources are tied into existing electrical grids and are configured to allow a driver to park near the source. The source includes a power panel, a transformer to convert grid voltage to voltage levels compatible with refrigeration unit operation, and a cord extending from the panel to plug into a socket located somewhere on the trailer. These power panels may be located at truck stops, rest stops and at commercial organizations that may receive a plurality of refrigerated trailers, such as a grocery chain warehouse, for example.

There is a significant limitation associated with the proposed power panels and trailer configurations to be used for refrigeration unit power supply. The panels are designed with a power cord that must be at least long enough to reach the trailer's power socket. The power cord is electrically connected to the transformer of the panel and so it is always "live." A concern exists with such an arrangement that the live end of the plug may contact the user, directly or indirectly, in a manner that will result in a terrible physical tragedy. Take as an example the situation where the person responsible for initiating refrigeration unit powering is standing next to the trailer near the trailer's socket on a rainy day or when the trailer is in standing water. The person must pull the live cord from a cradle on the panel and insert the plug into the trailer's socket. When powering is complete, such as when the person continues the trip to a final destination, the plug must be removed from the socket and returned to the cradle. In the course of either plugging in the cord into the socket or removing it from the socket, the person initiating engagement or disengagement of the plug can be electrocuted from an arc generated by contact with the plug. That person, as well as any other person in close proximity to the plug, could be electrocuted if the cord is dropped or left on the ground, particularly where there is standing water. Further, existing power arrangements may produce fire or electrocution caused by an electrical surge in the wiring system. Such possibilities can be avoided with a better trailer powering system.

Another similar problem that exists with the current project's power panel arrangement relates to the possibility that a person who has charged the refrigeration unit forgets to remove the power cord from the trailer's socket and drives the trailer away. Once the extent of the cord has been reached, the live cord will either be pulled out of the trailer's socket, resulting in a live wire left on the underlying surface, or the cord will be pulled out of the power panel, in which instance there could be a catastrophic failure of the panel or at least a live socket at the panel. Anyone inserting a faulty or incompatible plug into a live socket, or anyone who places any sort of object into a live socket, including individuals without any need to power a trailer refrigeration unit, may be electrocuted. Further, existing power panels having live sockets may themselves be faulty when exposed to inclement weather. All of these conditions are undesirable and should be avoided.

What is needed is a power supply system that is suitable for use with components, systems and the like in need, at least periodically, of power from a source. Such components, systems and the like may be referred to herein from time to time as mobile systems. The mobile systems include transportation or transportable equipment including, but not limited to, transportable trailers, cars, trucks, recreational vehicles, boats and ships. One type of mobile system to be discussed herein with respect to a preferred embodiment of the invention is a refrigerated trailer but, as noted, the invention is not limited thereto. What is also needed is such a power supply system that reduces the need to operate an engine or motor to supply energy to the mobile system when the mobile system is in a location where it is desirable to tap into a power grid to maintain one or more functions, such as refrigeration, for example. Further, what is needed is such a power supply system that is configured to minimize unsafe use or operation thereof

SUMMARY OF THE INVENTION

It is an object of the present invention to provide a power supply system that is suitable for use with mobile systems. It is also an object of the present invention to provide such a power supply system that reduces the need to operate an engine or motor to supply energy to the mobile system when the mobile system is in a location where it is desirable to tap into a power grid to maintain one or more functions. It is also an object of the present invention to provide such a power supply system that is configured to minimize unsafe use or operation thereof.

These and other objects are achieved with the present invention, which is a power supply system including a safety circuit panel with wall receptacle, a power cord with a safety ejection subsystem and an optional cord storage box. The safety circuit panel may be an existing panel, such as the power panel used in the NYSERDA project, modified to exclude a power cord and configured to include a wall receptacle with a socket arranged to be compatible with the power cord. The power cord has one end that plugs into the wall receptacle of the panel and a second end that is hardwired into a junction box, circuit board or any sort of equipment to be powered including, for example, a trailer refrigeration unit. The end of the plug that plugs into the safety circuit panel includes the safety ejection subsystem.

The safety ejection subsystem includes a self-ejecting latch that is securely attached to the plug end of the power cord. The latch is also attached to a tension line that terminates with secure fastening to the power cord, such as by weaving it into the power cord's insulative layer or layers. The safety ejection subsystem part of the present invention is configured to ensure that the cord will release from the wall receptacle in a situation when the user neglects to intentionally pull the power cord from the receptacle prior to the mobile system departing the location where the circuit panel is located. For example, if the mobile system powered via the circuit panel is a refrigerated trailer connected to a tractor and the driver fails to pull the power cord from the wall receptacle, the safety ejection subsystem exerts a pulling force at the plug end of the power cord as the cord itself is being pulled by the trailer. The self-ejecting latch is of sufficient structural integrity that it will only pull the cord at the plug/receptacle interface and not somewhere intermediate on the power cord itself, which could otherwise result in live wire exposed and still joined to the circuit panel receptacle. The electrical components that move with the mobile system are no longer active when disconnection from the circuit panel occurs. Likewise, upon disengaging, the power to the circuit panel is cut based on a complicated connector arrangement that ensures there is no power at the receptacle when the plug is inserted and when the plug is removed. Also, an "on" switch must be engaged before charges pass to the receptacle. The connector, which may be a six-pin connector or other complicated connector, is arranged to ensure that only one satisfactory interfacing of plug to receptacle exists for power to pass from the circuit panel to the power cord. The six-pin connector configuration described herein provides a complicated connection arranged in a way that eliminates the possibility of a powered faulty connection between the power cord and the wall receptacle socket. It is to be understood that other numbers of pins and associated ports or pinholes may be employed without deviating from the invention. Standard plug operations do not use complicated pin combinations, thereby allowing foreign objects and faulty plugs to receive power. Standard plug operations do not provide automatic power shutoff and breakaway protection. The present invention provides such safety features. Further, an insulated and weatherproof hinged sealing cover of the socket substantially minimizes the exposure of the ports of the wall receptacle socket to any liquid or human contact. Two embodiments of the invention are described herein. A first embodiment for which the power cord is connected from a device to be powered to the power supply and a second embodiment for which the power cord is hardwired to the power supply and the device to be powered is connected to the power cord but needs no power cord itself.

The configuration of the power supply system of the present invention enables users to power mobile systems with grid power through means that may be accessible in otherwise remote locations, or at least in locations where it may be difficult to power mobile systems in a conventional manner. This invention thereby provides access to power sources while minimizing or eliminating the need to operate an engine or motor to supply energy to the mobile system while also ensuring that safety of the system and of any user is not compromised. These and other advantages of the present invention will be more fully understood upon review of the following detailed description, the accompanying drawings, and the appended claims.

DETAILED DESCRIPTION OF PREFERRED EMBODIMENTS OF THE INVENTION

Figure 1:
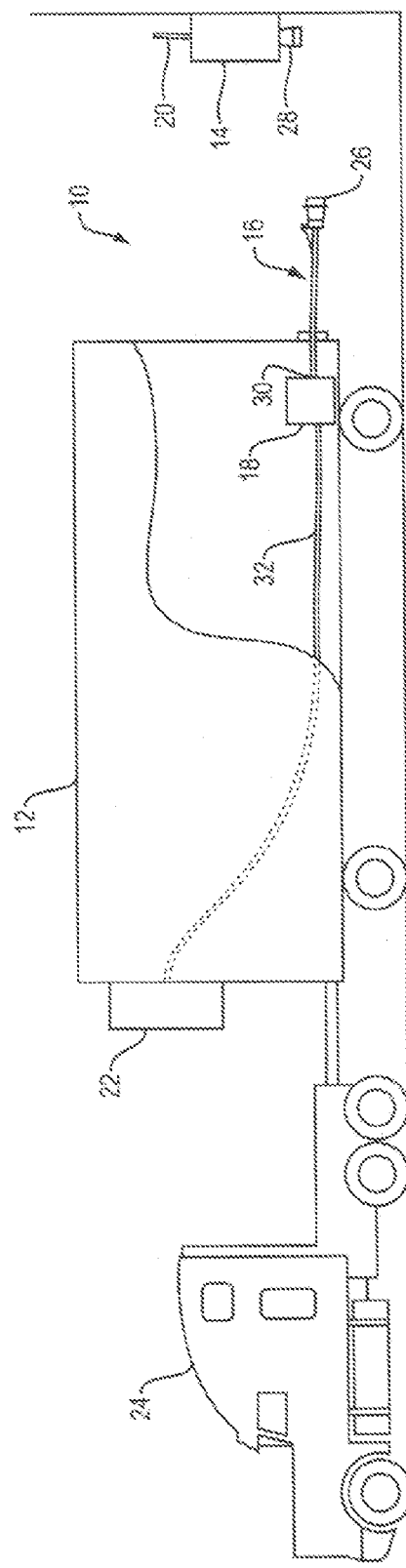
FIG. 1 is a side view of a simplified representation of a first embodiment of the power supply system of the present invention associated with a mobile structure in the form of a refrigerated trailer.

A power supply system 10 of a first embodiment of the present invention is shown associated with a refrigerated trailer 12 in FIG. 1. The power supply system 10 includes a safety circuit panel 14, a power cord 16 and an optional cord storage box 18. The safety circuit panel 14 is coupled to grid power through panel cord 20, which provides electricity into the panel 14 for the purpose of connection to a power conductor, such as one or more wires of power cord 16. In the example usage represented in FIG. 1, the circuit panel 14 may be used to supply power to an engine of a refrigeration unit 22 of the trailer 12. In this way, the refrigeration unit 22 may be operated to keep the contents of the trailer 12 temperature controlled using grid power rather than power from the engine of the refrigeration unit 22, which itself must be powered by a tractor 24 used to haul the trailer 12. The power cord 16 includes a first end 26 for releasable connection to a wall receptacle 28 of the circuit panel 14 and a second end 30 to connect to a cable 32 that connects to a power supply receptor of the refrigeration unit 22. Alternatively, the second end 30 of the power cord 16 may connect directly to the refrigeration unit 22. It is to be understood that the power supply system 10 may be used to supply power to other types of systems, including mobile systems requiring power at one or more locations.

The second end 30 of the power cord 16 may also be connected to an electric standby kit for interfacing with the cable 32, the refrigeration unit 22 or another electrical conduit or load. The standby kit may be located at the perimeter of the trailer 12 or elsewhere between the cable 32, refrigeration unit 22 or other component and include a twist lock wire junction. The twist lock junction may include an interlocking waterproof plug and receptacle for interfacing with the second end 30 of the power cord 16. The addition of a twist lock junction creates a removable wire section that can include the first end 26 of the power cord 16.

Figure 2:
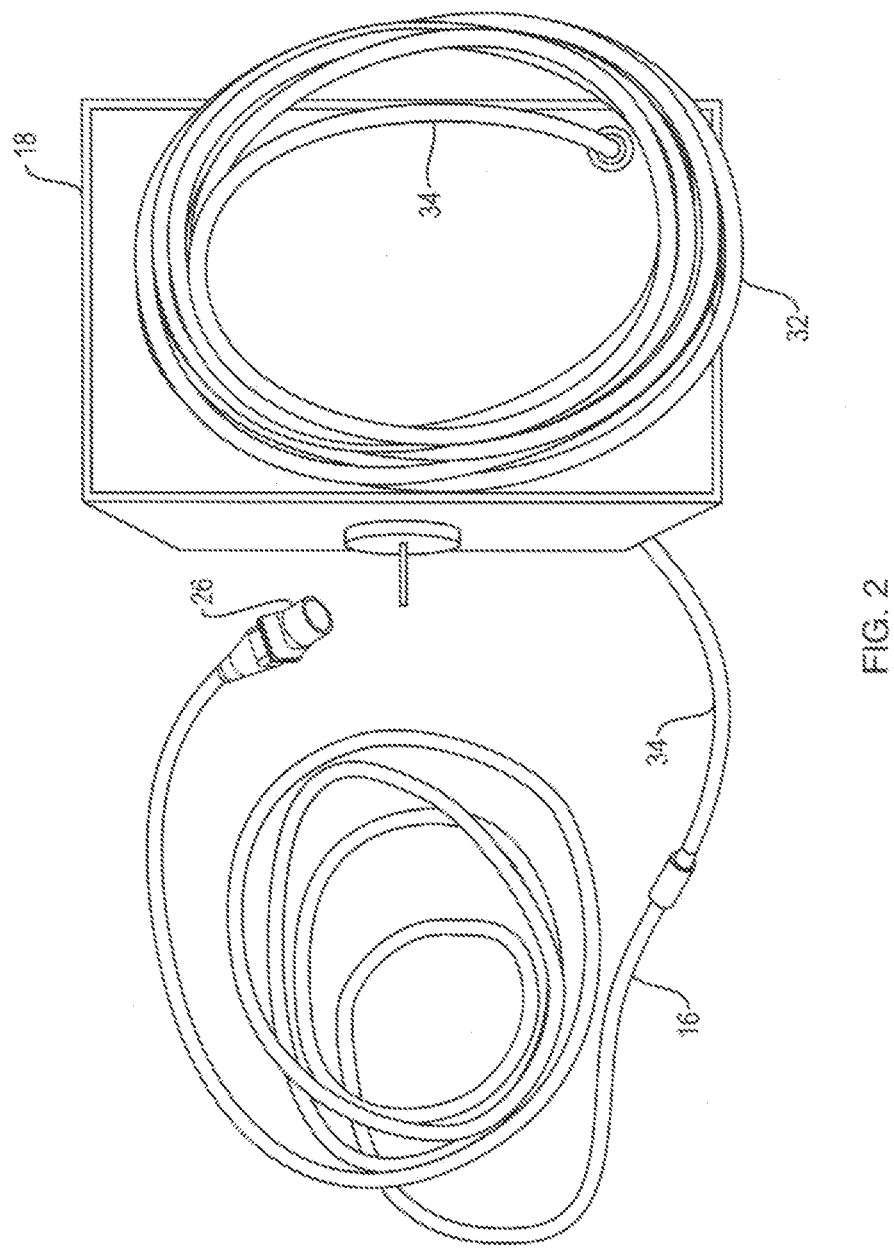
FIG. 2 is a top view of the power cord, supply cord and optional storage box of the first embodiment of the present invention.
Figure 3:
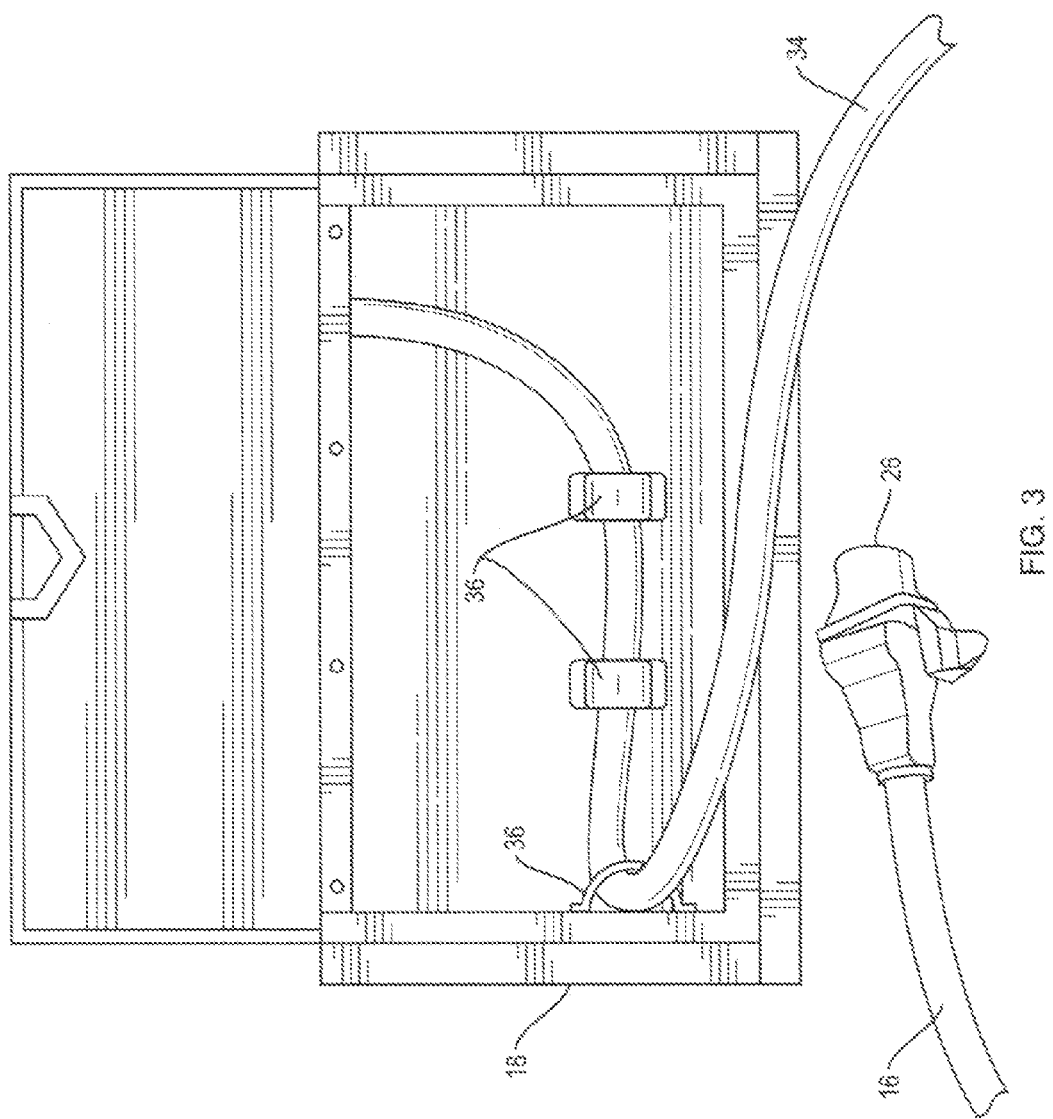
FIG. 3 is a side view of the optional storage box in an open position.

As illustrated in FIGS. 2 and 3, the optional cord storage box 18 provides a location for retaining the power cord 16 therein. When the system 10 includes the cable 32, an interface conduit 34 is used to join the two together, wherein a portion of the interface conduit 34 is retained within the storage box 18 using one or more conduit fasteners 36 and a remainder of the conduit 34 is located external to the storage box 18. The length of the conduit 34 is selectable and the extent of its exposure outside of the storage box 18 is also selectable. The conduit 34 is fabricated of material to be compatible with the power cord 16 and the cable 32 and to ensure that it survives in the environment where the power cord 16 is expected to remain functional. It is also to be noted that the lengths of the power cord 16 and the cable 32 are selectable. The storage box 18 shown in the figures is a representation of its shape. It may be of a different size and shape. Further, it may include a reel for the cable 32, the power cord 16 or both. A reel may be used instead of a specific container. The opening for the box 18 may vary from that shown and it may be fabricated of any material suitable for the storage purpose.

Figure 4:
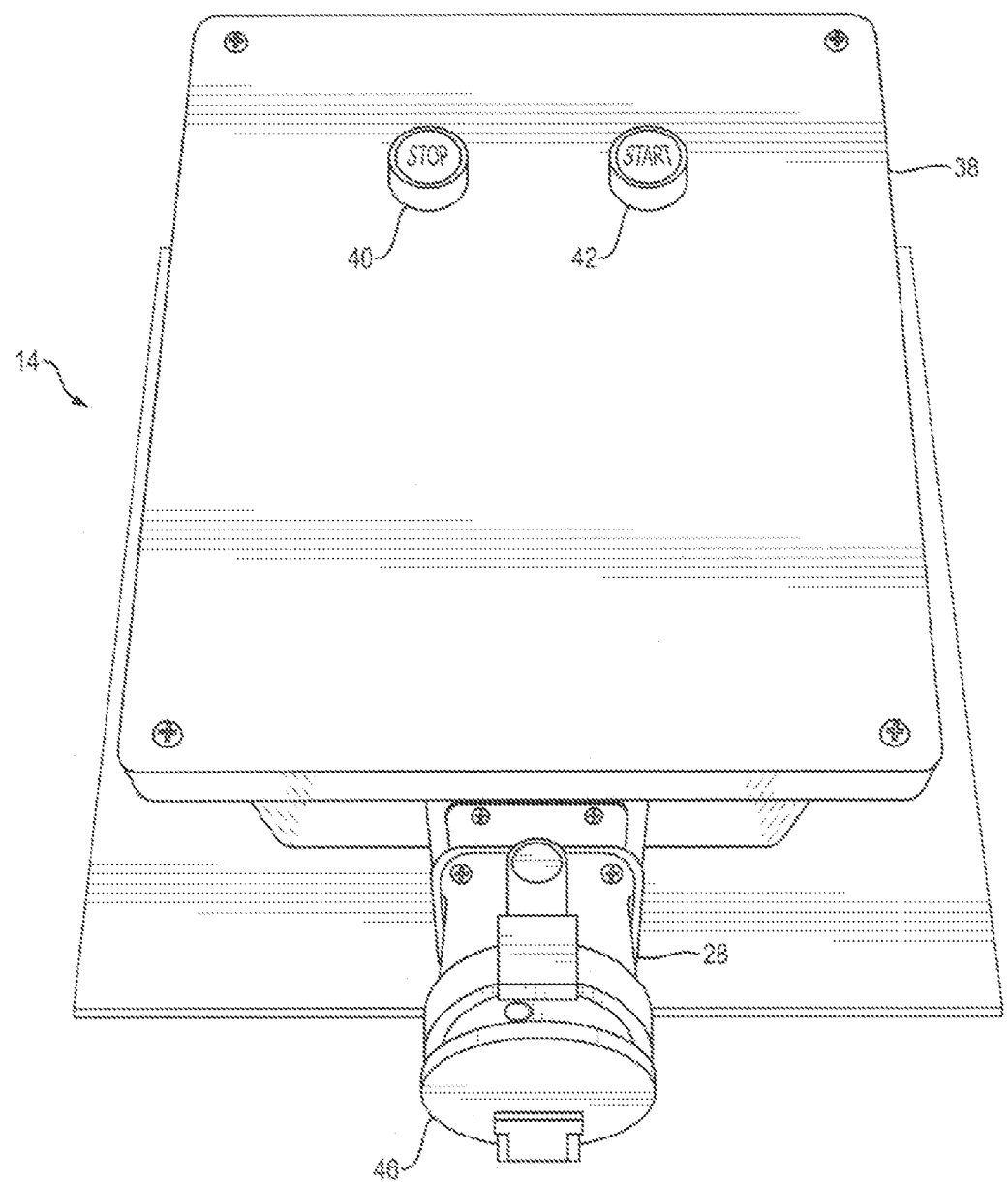
FIG. 4 is a front perspective view of the safety circuit panel of the first embodiment of the present invention showing the wall receptacle closed.
Figure 5:
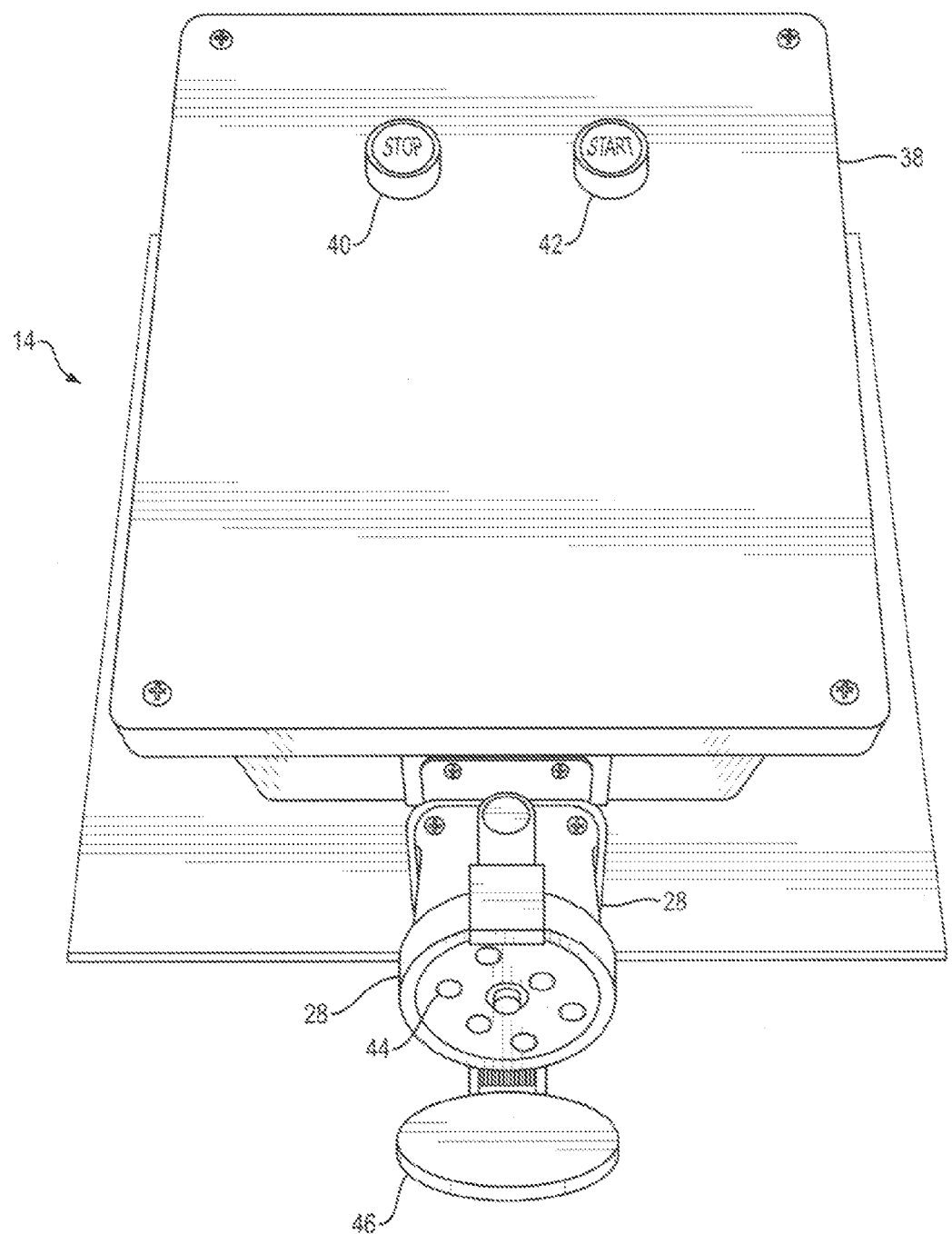
FIG. 5 is a bottom perspective view of the safety circuit panel of the first embodiment of the present invention showing the wall receptacle open.

As illustrated in FIGS. 4 and 5, the circuit panel 14 includes a casement 38 and the wall receptacle 28. The casement 38 may be any sort of container to retain therein electrical components suitable for interfacing with a power grid and transforming grid voltage to commonly used voltage levels. For example, the circuit panel 14 may include within the casement 38 a 30 A/480VAC/3-phase contactor with a 120V coil. It may also include a 50 A/480V/120VAC transformer with primary and secondary mini breaker protection, with power supply wiring terminating in wall receptacle 28. The circuit panel 14 may also include stop button 40 and start button 42 as additional safety features for the purpose of activating and deactivating the wall receptacle 28. The circuit panel 14 suitable for the present invention is part number AGD39003 available from the Meltric Corporation of Franklin, Wis., configured as described herein, and including a primary transformer and at least one secondary transformer to step down the power from the panel cord 20 to the wall receptacle 28 as is known by those of skill in this art. The circuit panel 14 may include one or more ground fault circuit interrupters as a safety feature.

The circuit panel 14 includes the wall receptacle 28 of the present invention. The wall receptacle 28 is part number AGD34043 also available from the Meltric Corporation modified to include a six-hole port 44 compatible with the configuration of the first end 26 of the power cord 16. Other port arrangements are possible without deviating from the function of the present invention. That is, the port and pin combinations may vary from six in number. The wall receptacle 28 may include a ground fault circuit interrupter as a safety feature. The wall receptacle 28 includes a hinged sealing cover 46 used to seal the six-hole port 44 from exposure to the environment when the wall receptacle 26 is not in use. The hinged sealing cover 46 is spring-tensioned so that it must be forced open. It only remains open when the power cord 16 is connected to the wall receptacle 28. When a user wishes to supply power to something, such as the refrigeration unit 22, the first end 26 of the power cord 16 is inserted into the wall receptacle 28 and the start button 42 pressed. When usage is completed, the stop button 40 is pressed and the power cord 16 removed from the wall receptacle 28.

Figure 6:
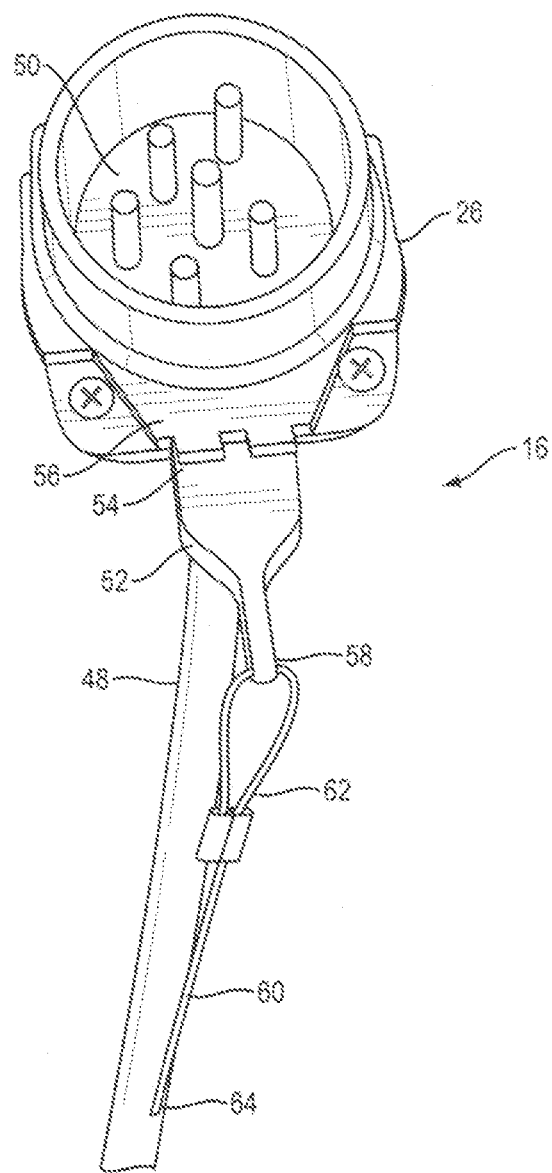
FIG. 6 is a front perspective view of the plug end of the power cord of the first embodiment of the present invention.

As illustrated in FIG. 6, the power cord 16 includes a wire conduit portion 48 and the first end 26. The first end includes a safety ejector subsystem with a connector including a six-pin plug face 50 configured for engagement with the six-hole port 44 of the wall receptacle 28. Other pin arrangements are possible without deviating from the function of the present invention. That is, the port and pin combinations may vary from six in number. The first end 26 of the power cord may include a ground fault circuit interrupter as a safety feature. The first end 26 also includes a latch 52 having a first end 54 affixed to a housing 56 of the plug face 50, and a second end 58 joined to a tension line 60. The tension line 60 includes a first end 62 coupled to the second end 58 of the latch 52, and a second end 64 connected to the power cord 26 itself, through a securing arrangement, such as by weaving it into the one or more insulative layers of the exterior of the power cord 16. The tension line 60 is preferably fabricated of material sufficient to ensure that it will not fail before the power cord 16 or the plug face 50 fails when all are placed in tension. The latch 52 is also similarly fabricated not to fail before the power cord 16 or the plug face fails when all are placed in tension. For example, the tension line 60 may be steel cable and the latch may be made of stainless steel.

The latch 52 and the tension line 60 act together to ensure that the power cord 16 will be disconnected from the wall receptacle 28 when a mobile system, such as the trailer 12 moves away from the panel 14 without completing the step of actively removing the power cord 16 from the panel 14. Specifically, as the trailer 12 or other system moves away from the panel while the power cord 16 is still connected to the wall receptacle 28, the power cord extends its entire length and in doing so, places the tension line 60 in complete tension. When in that condition, it keeps the power cord 16 from failing so that the disconnection of the power cord 16 only occurs at the six-hole port 44—as desired. That disconnection occurs at that location when the trailer 12 reaches a distance from the panel 14 sufficient to provide the load required to make that disconnection happen. Upon disconnection, power to the circuit panel 14 is also eliminated and so there is no live interface at the wall receptacle 28. The disconnection at the plug-port interface causes the sealing cover 46 to pivot into place covering the six-hole port 44.

The safety of the power supply system 10 of the present invention is assured based on the configuration of the panel 14. The panel 14 is hard wired to the substrate to which it is affixed, the wall receptacle 28 is securely connected and wired to the components within the casement 38 and the power cord 16 is wired, directly or indirectly, to the refrigeration unit 22. The panel is configured to ensure that when the connector at the first end 26 of the power cord 16 is released from the wall receptacle 28, power automatically shuts off. This is achieved by establishing a holding contact arrangement by which all three components of the contacts of the connector of the cord 16, at least the primary transformer within the casement 38 and the start 42 button of the casement 38 must be in contact with one another at the same time for any charge to flow to the port 44 of the wall receptacle 28. Exclusion of any of those components stops power at the panel cord 20.

The indicated configuration is the only way to engage power for its provision at the wall receptacle 28. However, there are two ways to disrupt power. In order to engage power, all six pins of the six-pin plug face 50 must be correctly aligned and securely engaged with the ports of the six-hole port 44 of the wall receptacle 28. Inserting the first end 26 of the power cord 16 into the receptacle 28 completes an electrical circuit at the wall receptacle 28. A user can energize the six-hole port 44 to supply the power cord 16 by engaging the start button 42. When that occurs, the transformer of the panel 14 steps down the 480 voltage supply provided by the panel cord 20 to 120 volts. A failed connection at the receptacle 28 or failed engagement of the start button 42 will result in no power at the receptacle 28. To disrupt power at the receptacle 28, the user can simply press the stop button 40, which breaks the electrical circuit and kills power to the receptacle 28. Power is also killed at the receptacle 28 by disengagement of the six-pin plug face 50 from the six-hole port 44-either intentional or unintentional.

While power is on and being transferred through the power cord 16 to the refrigeration unit 22, it will immediately be shut off and removed if the first end 26 becomes disengaged from the receptacle 28. Disengagement of any of the 6 pins de-energizes the power cord 16 by breaking the established circuit. When the circuit is broken, there is no power through the panel 14 and simply pressing the start button 42 will not provide power to it. In order for power to be restored, the power cord 16 must be correctly re-inserted into the receptacle 28 and then the start button 42 pressed.

In the preferred embodiment of the first embodiment of the present invention, the panel 14 includes one fuse on the primary transformer and two fuses on the secondary transformer. These fuses should only have a two-aperture forgiveness so that any surge in the electrical circuit established when the power cord 16 is engaged with the receptacle 28 would trip at least one of the fuses and break the circuit, resulting in immediate stoppage of power. The stop 40 and start 42 buttons contain bright LED lights for enhanced visibility at night. All components of the panel 14 are UL 508 listed. The panel 14, the exteriors of the first end 26 of the power cord 16 and the receptacle 28 are fabricated of weather-resistant material, such as weatherproof fiberglass and nylon material to protect electrical components. The receptacle 28 is configured for passage of standard electrical finger probe tests. The receptacle 28 contains are enclosure protection to keep any arcing safely inside the receptacle 28 and not in the outside environment where a user can be electrocuted. The combination of the power cord 16 with self-ejecting first end 26, the arc enclosing arrangement of the receptacle 28, and the configuration of the panel 14 described herein all provide substantial protection against multiple possibilities of electrocution.

The system 10 of the first embodiment of the present invention can be used to retrofit current electric standby operations in order to replace unsafe plug systems or it can used for initial install for new electric standby operations. The pin configurations and breakaway protection provided by the present invention minimize safety problems associated with existing power supply arrangements.

Figure 7:
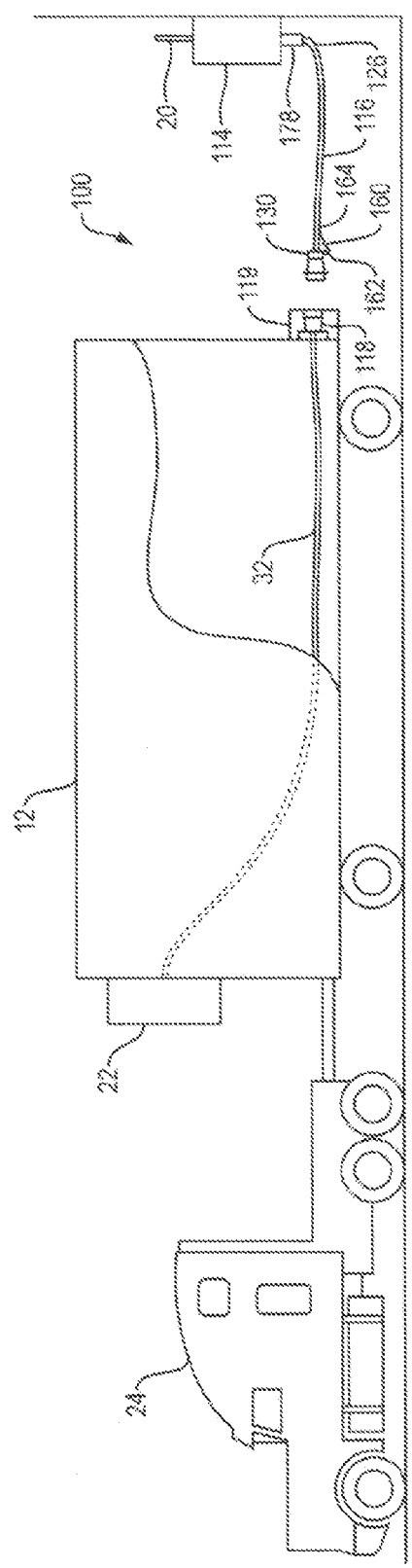
FIG. 7 is a side view of a simplified representation of a second embodiment of the power supply system of the present invention associated with a mobile structure in the form of a refrigerated trailer.
Figure 9:
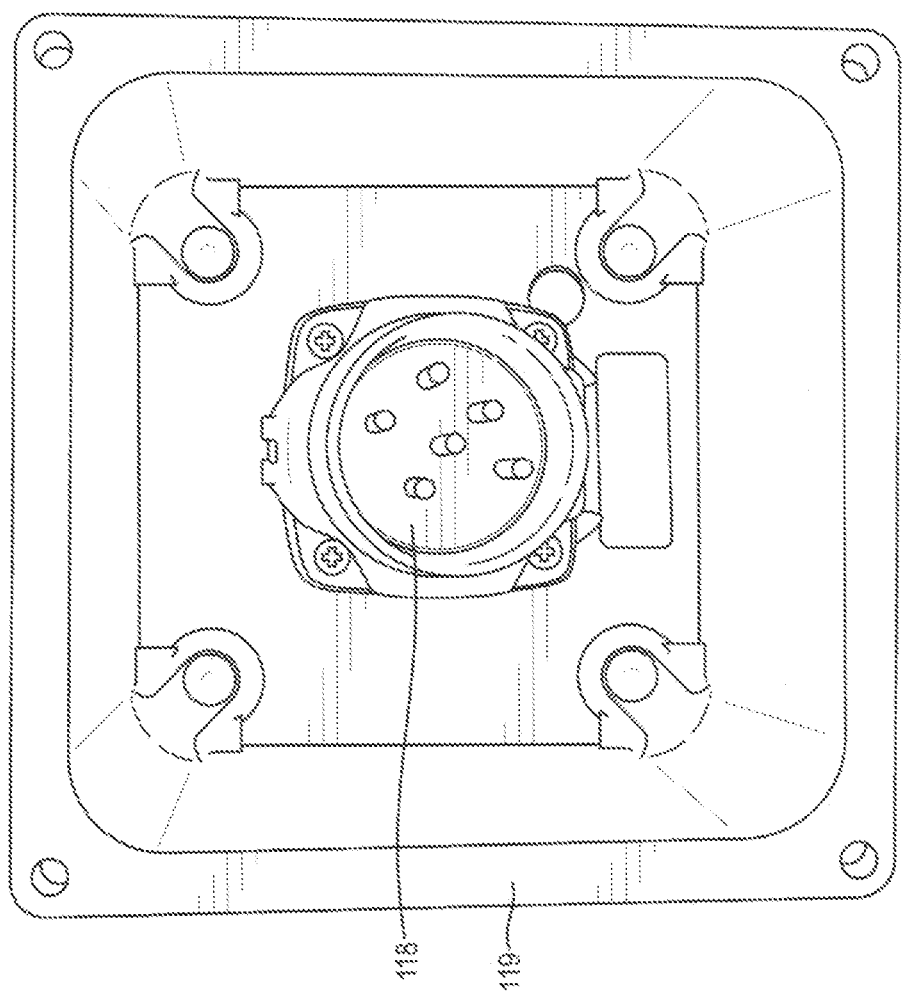
FIG. 9 is a front view of a portion of the second embodiment of the power supply system showing the six-pin male power plug in the containment box.

A power supply system 100 of a second embodiment of the present invention is shown associated with a refrigerated trailer 12 in FIG. 7. The power supply system 100 includes a safety circuit panel 114, a power cord 116 and a power plug 118 that may be contained in a containment box 119, shown in FIG. 9. The length of the power cord 116 is selectable. The power plug 118 is configured to ensure that current moves to the trailer 12 when it and the power cord 116 are aligned and connected in a specific way. In this embodiment, the power plug 118 includes a six-pin face that engages with a six-pinhole plug face 150 of the power cord 116. Current only moves when the two are properly aligned and engaged. The trailer 12 may include the optional cord storage box 18. The safety circuit panel 114 is coupled to grid power through panel cord 20, which provides electricity into the panel 114 for the purpose of connection to a power conductor, such as one or more wires of the power cord 116. In the example usage represented in FIG. 7, the circuit panel 14 may be used to supply power to an engine of the refrigeration unit 22 of the trailer 12 through cable 32. In this way, the refrigeration unit 22 may be operated to keep the contents of the trailer 12 temperature controlled using grid power rather than power from the engine of the refrigeration unit 22, which itself must be powered by the tractor 24 used to haul the trailer 12. It is to be understood that while the present description is specific concerning the number of pins and pinholes, the power supply system of the present invention may use a different number of pins and corresponding pinholes or ports without deviating from the invention. The present invention includes a connector configuration that ensures current only runs through that connection and the associated pins and pinholes when the pins and pinholes are aligned and connected together. Any condition other than that will not permit current through the connection. It is contemplated that a configuration may be established wherein additional superfluous pins and/or pinholes may exist in the plug 118 and/or the power cord 116 but that are not necessarily specifically connected as long as those pins and pinholes that are configured for alignment and engagement are so aligned and engaged in order for current to pass through the power cord 116.

Figure 8:
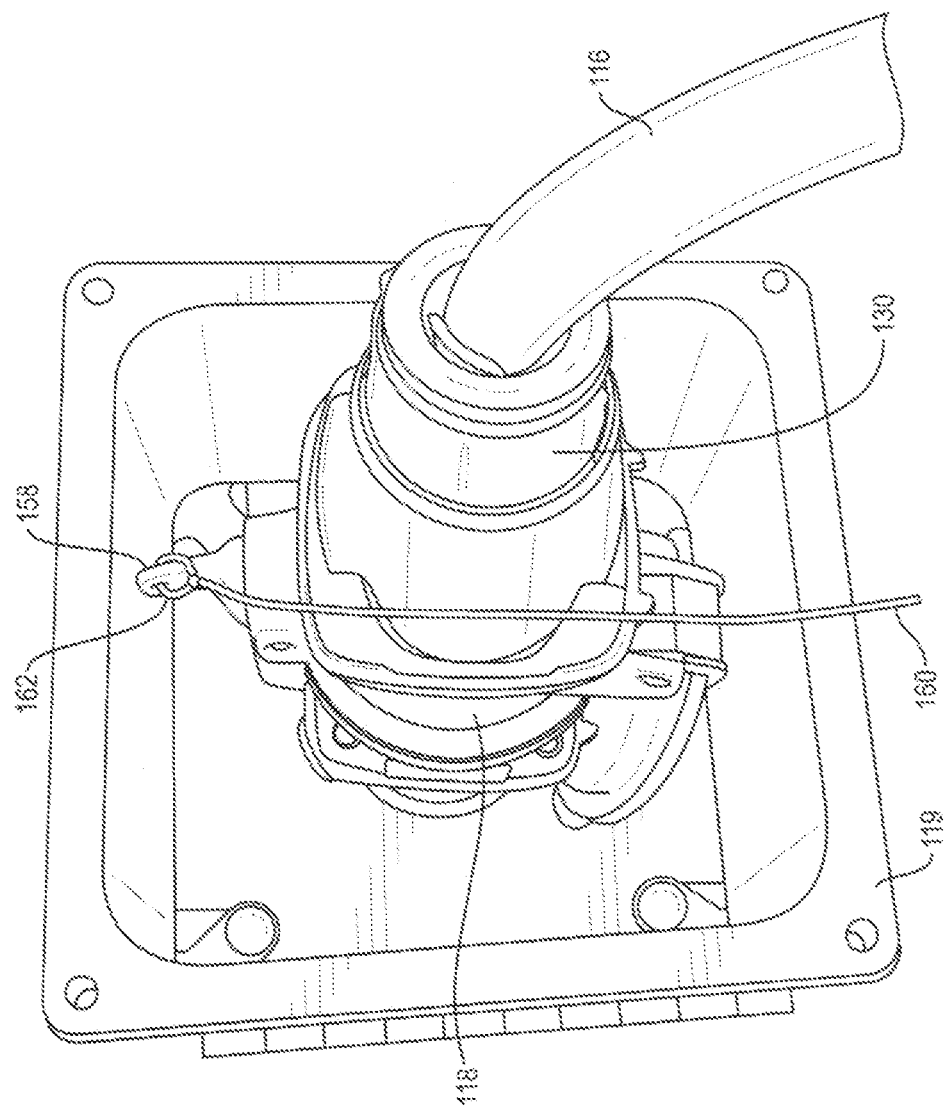
FIG. 8 is a perspective view of a portion of the second embodiment of the power supply system showing the containment box open and the power cord connected to the power plug.
Figure 10:
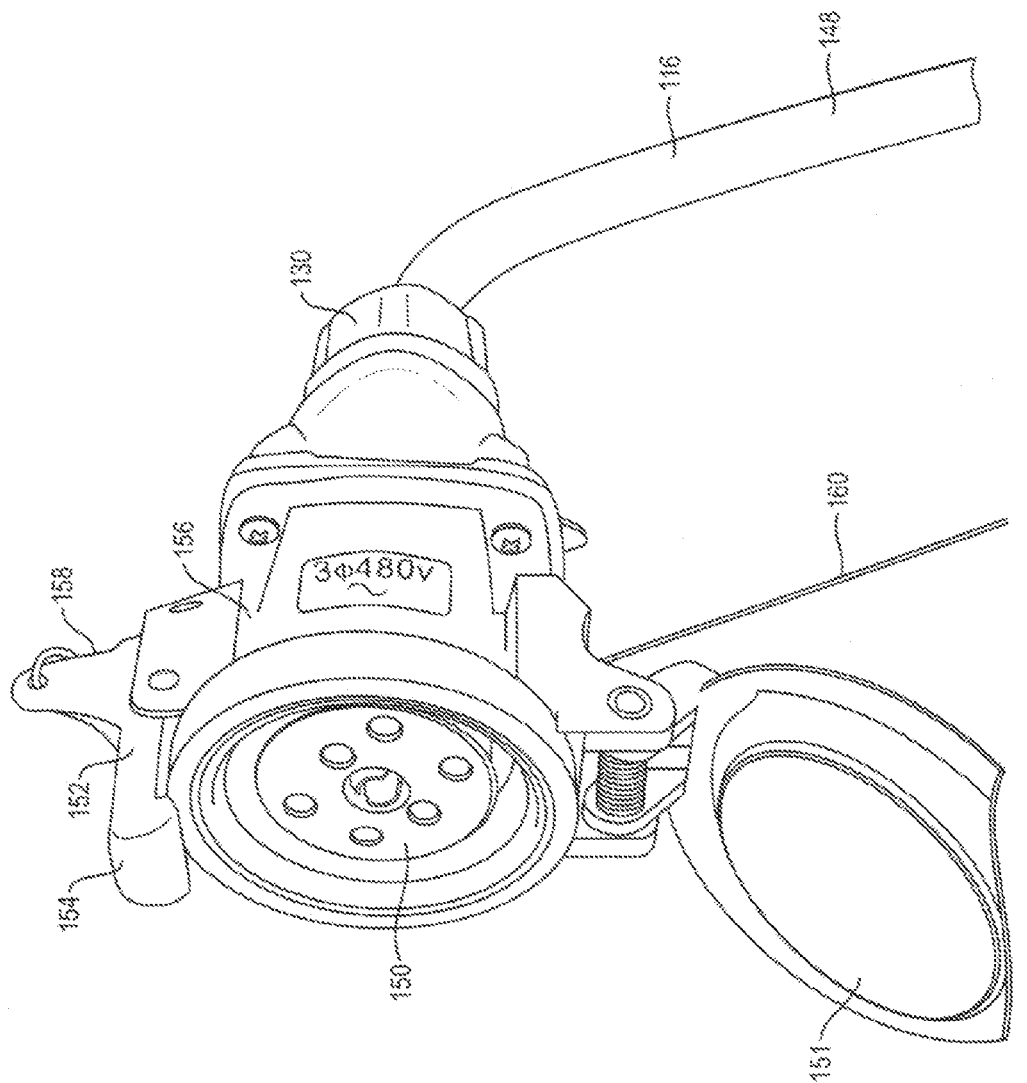
FIG. 10 is a perspective view of a portion of the second embodiment of the power supply system showing the six-port female end of the power cable.

As illustrated in FIGS. 7, 8 and 10, the power cord 116 includes a first end 126 wired to power supply wiring within the safety circuit panel 114 and a second end 130 releasably connectable to the power plug 118. The power cord 116 includes a wire conduit portion 148 and the second end 130 includes spring-loaded cover 151 and a safety ejector subsystem with a connector including a six-pinhole plug face 150 configured for engagement with the six-pin power plug 118 shown in FIG. 9. The second end 130 of the power cord 118 may include a ground fault circuit interrupter as a safety feature. The second end 130 also includes a self-ejecting latch 152 having a first end 154 affixed to a housing 156, and a second end 158 joined to a tension line 160 shown in FIGS. 7, 8, 10 and 11. The tension line 160 includes a first end 162 coupled to the second end 158 of the latch 152, and a second end 164 connected to the power cord 116 itself, through a securing arrangement, such as by weaving it into the one or more insulative layers of the exterior of the power cord 116. When the power cord 116 is placed in tension, the tension line 160 is as well. When that tension is great enough, the six-pinhole plug face 150 of the power cord 116 disengages from the six-pin power plug 118. The tension line 160 is preferably fabricated of material sufficient to ensure that it will not fail before the six-pin power plug 118 and the six-pinhole plug face 150 disengage from one another. The tension line 160 may be steel cable and the latch 152 may be made of stainless steel but both items may be made of other materials.

Figure 11:
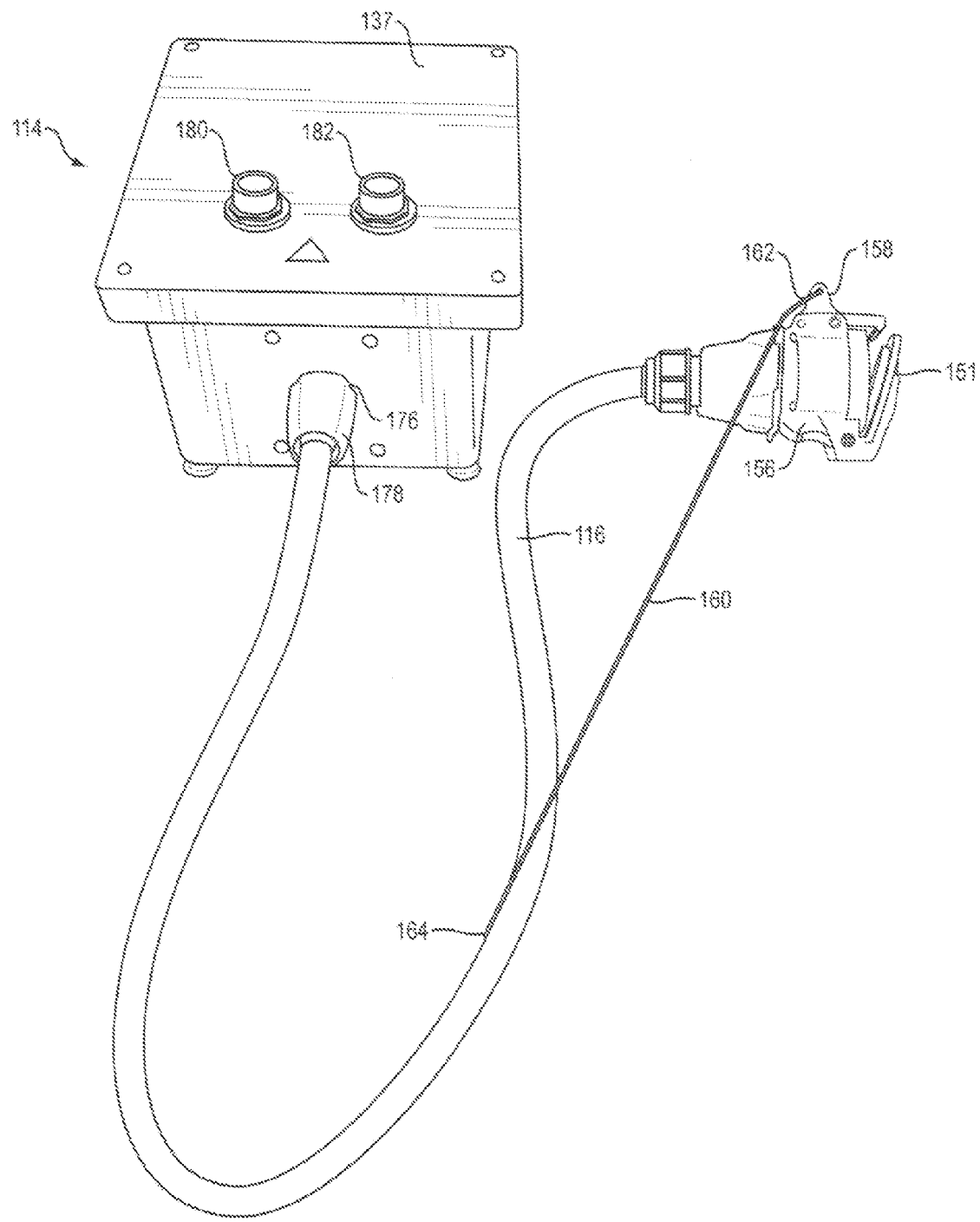
FIG. 11 is a perspective view of a portion of the second embodiment of the power supply system showing the safety circuit panel and the power cable.
Figure 12:
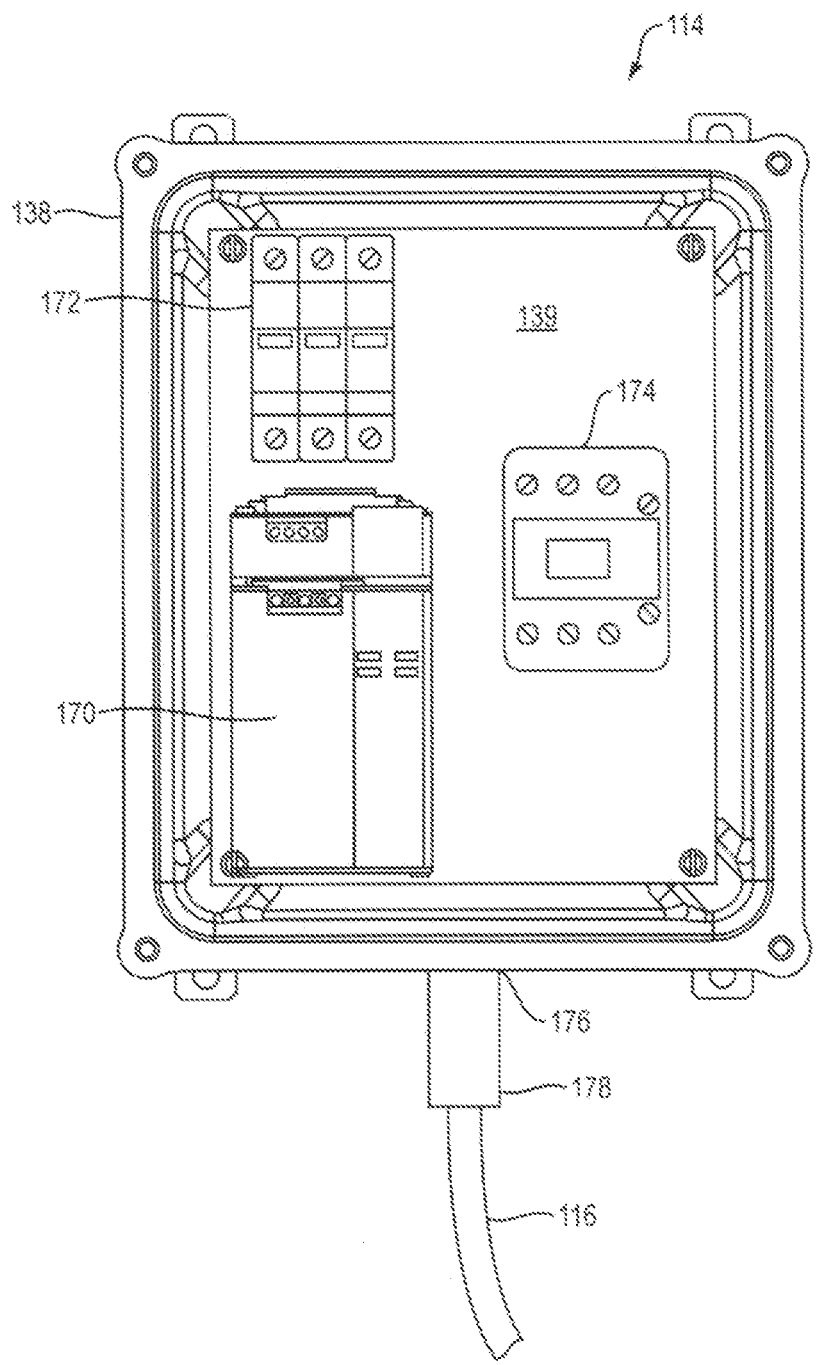
FIG. 12 is a front view of the interior of the safety circuit panel.

As illustrated in FIGS. 11 and 12, the circuit panel 114 includes a hinged front cover 137, a casement 138 and a back panel 139. The casement 138 may be any sort of container to retain therein electrical components suitable for interfacing with a power grid and transforming grid voltage to commonly used voltage levels including, for example but not limited to, a NEMA 4x molded weatherproof fiberglass enclosure. The size of the casement 138 can vary in size and dimensions and may include additional features in addition to the electrical components therein. For example, it may include one or more locking components, meters, credit card readers (when the present invention is used for the retail supply of power, for example) and such other accessories of interest to anyone supply power through the systems 10 and 100 of the present invention.

Figure 13:
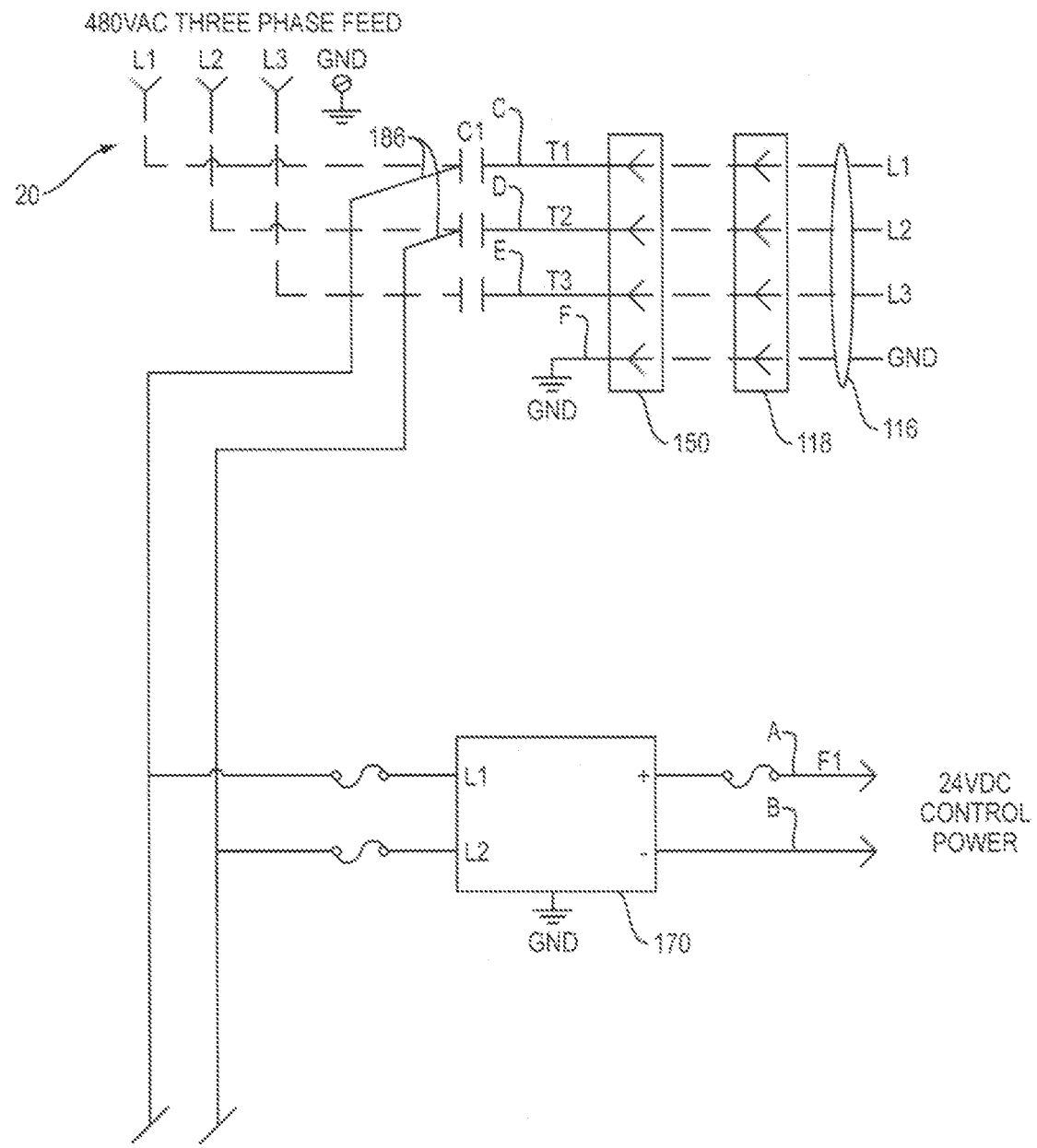
FIG. 13 is a circuit diagram representing a portion of the wiring of the safety circuit.
Figure 14:
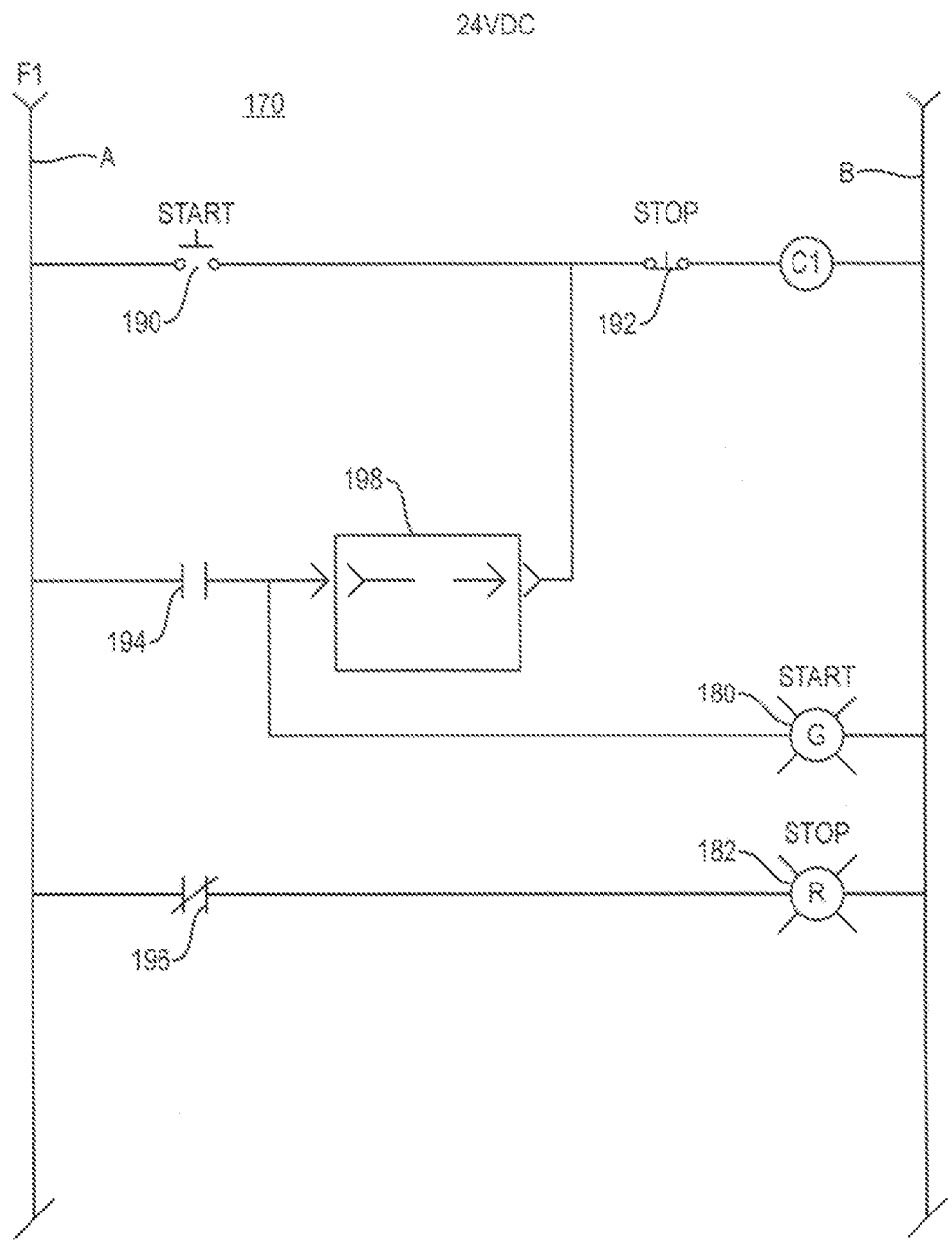
FIG. 14 is a circuit diagram representing a portion of the wiring of the safety circuit.

The circuit panel 114 includes within the casement 138 joined to the back panel 139 a 24VDC power supply 170, fuse holders 172 including a primary fuse and a secondary fuse, and a 24VDC contactor 174. The primary fuse and the secondary fuse protect against any electrical surges. The front cover 137 includes ports for retaining thereto start button 180 and stop button 182. The circuit panel 114 includes a power cord port 176 through which wires of the power cord 116 pass. The circuit panel 114 further includes a strain relief jacket 178 that may be a stainless steel strain relief device suitable for minimizing strain wear on the first end 126 of the power cord 116 as it is used over time. In particular, the strain relief jacket 178 protects the power cord 116 and the circuit panel 114 from strain that may cause kinking of wiring therein or any other form of excessive strain degradation. FIGS. 13 and 14 represent a circuit diagram showing the wiring of the components described herein of a safety circuit associated with the 24VDC power supply 170, wherein the DC power supply 170 controls whether any power from supply 20 passes into the power cord 116.

The DC power supply 170 enables the provisioning of a much lower voltage in the safety circuit shown that only permits current from the supply 20 to reach the power cord 116 when all six pins of the six-pin power plug 118 and the six-pinhole face 150 of the power cord 116 are engaged. Consequently, no current passes if any of the six are not properly aligned and engaged. For further safety, tap 186 draws power from the supply 20 and is converted to 24VDC at the 24VDC power supply 170. The output of the power supply 170 occurs at two wires of six wires of the power cord 116 that are joined to two of the six pinholes of six-pinhole face 150. Those two wires are represented as power tap wires A and B. As illustrated in FIG. 14, power supply 170 includes the two wires A and B, as well as start button 180, stop button 182, normally open start contact 190, normally closed stop contact 192, normally open start contact 194, normally closed stop contact 196 and start interconnector 198.

The circuit is only complete for the purpose of supplying current through power supply wires C, D, E and F associated with the remaining four pinholes of the six-pinhole face 150 to the trailer 12 or any other apparatus to be powered when the six elements are aligned and connected, including the pins to complete the circuit of the power supply 170. When those pins and their pinholes are aligned and engaged, only then will the contacts 190 and 194 will be in the "open" state. Only then can the start button 180 be pushed to engage those contacts, and only then does the 480VAC supplied by the source 20 move via wires C-F of the power cord 160 to the power plug 118. When the operator is done, he/she presses the stop button 182 disengages the circuit of the power supply 170 at the circuit panel 114, stopping current through the circuit of the power supply 170 as well as the current through wires C-F. The operator can then safely disconnect the power cord 116 from the power plug 118 without fear of arcing or shock. The operator can be standing in water or even drop the power cord 116 in water but will not conduct electricity because in order for any current to pass into the power cord 116, all elements of the six-pin power plug 118 and the six-pinhole face 150 must be engaged. Furthermore, if the operator forgets to first press the stop button 182 before disconnecting the power cord 116 from the power plug 118, such as in a "drive off" situation, the power at the panel 114 to the power cord 116 shuts off immediately with the disengagement of any of the six pins of the power plug 118. Therefore, no arcing or shocking can occur in such a situation. The safety circuit configuration shown and described herein may also be used with respect to the system 10 of the first embodiment of the invention.

The system 100 of the present invention may be used to supply power at other voltages, including 240V and 120V, for example. While shown as supplying a refrigerated trailer 12, it may be used to supply any other type of vehicle or other device, element, apparatus or system that requires power and that may need that power at a location of interest. For example, the system 100 can be used for electric plug-in needs such as campers, watercraft, non-refrigerated trailers, trucks, cars and any sort of device that may be portable.

In either of system 10 or system 100, it is noted that the safety circuit arrangement described and illustrated herein may be supplemented with, or replaced by, one or more functions embodied in software, hardware or a combination thereof contained in a solid state circuit arrangement such as a "smart" chip or other form of microchip, for example. Such a safety circuit arrangement is configured to include one or more sensors for sensing the existence or lack of contact between at least one pin and at least one corresponding pinhole or port and if the sensed information indicates that a proper alignment and engagement does not exist, then the safety circuit transmits a communication, such as an electronic signal, to a contact, relay, switch or the like that is coupled to the panel supply such as panel cord 20 and configured to block current to the power cord 16/116 upon receipt of such a signal—or upon detection that a signal indicative of a proper connection has been lost. The sensor may be a voltage meter across one or more wires of the power cord 16/116, and/or any one or more of the pins and/or pinholes. The sensor may also be a current meter arranged in-line with one or more wires of the power cord 16/116. Other sensor arrangements are possible. The smart chip or microchip may be programmed such as a programmable logic controller (PLC) or a system on an integrated circuit (SOIC) including hardware and programmed with a programming language such as C++ to carry out the functions of gathering information from the one or more sensors and transmitting control instructions to the contact, relay, switch or the like to shut off power from the panel cord 20 to the power cord 16/116. All components of the alternative or additive safety circuitry, including the sensors and switches, may be embodied in the microchip or a set of a plurality of microchips.

A further optional feature of either or both of systems 10 and 100 is the inclusion of a sensor to sense a breach of the power cord 16/116 while the power cord 16 is connected to the receptacle 28 or the power cord 116 is connected to the power plug 118. That breaching sensor is configured to detect the exposure of one or more wires of the power cord 16/116. When such a breach has been detected, a signal is communicated from the sensor to the safety circuit, which may be or may include the solid state circuit arrangement described above, which actives a contact, relay or switch to block power from the panel cord 20 to the power cord 16,116. The sensor may be a continuity detector that detects any change in the insulative characteristics of the jacket of the power cord 16/116 or that detects a current surge at any of the wires of the power cord 16/116 and signals the existence of that change in condition to the safety circuit. This breach sensing for the purpose of halting current through the power cord 16/116 may also be used to detect exposure of the pins of the wall receptacle 28 or the power plug 118.

Another optional feature of either embodiment of the present invention is a data storage device, such as an electronic device including a data gathering tool and a database. The data storage device may be configured to gather and store data about the operation of the system 10/100 including, but not limited to, the number of times the system is used, the length of time of use each time it is used, the number of times and conditions of when the safety circuitry has been activated to cut off power and the amount of power used at the particular location. The data storage device may also be used to identify maintenance needs, such as the failure of any one or more component of the system 10/100. That data gathered may be uploaded to a transceiver device for the purpose of either allowing its secure download at the location or for remote transmission to a management site. The transceiver may also be used to receive modification instructions, such as to be delivered to the safety circuitry, from the remote management location.

Figure 15:
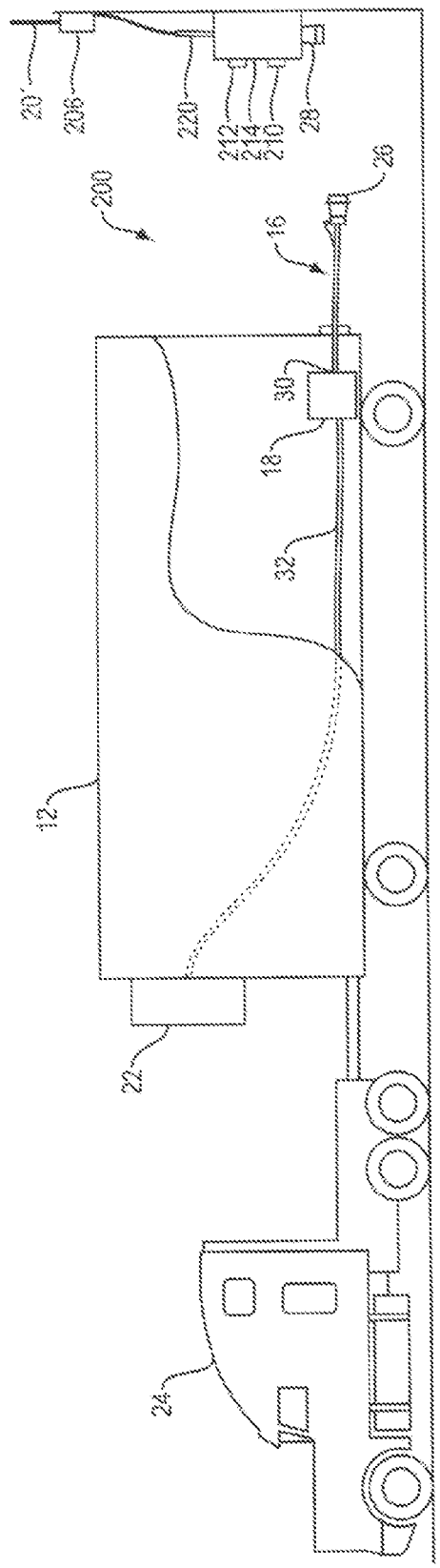
FIG. 15 is a side view of a simplified representation of a third embodiment of the power supply system of the present invention associated with a mobile structure in the form of a refrigerated trailer.

A power supply system 200 of a third embodiment of the present invention is shown associated with refrigerated trailer 12 in FIG. 15. The power supply system 200 includes a safety circuit panel 206, a remote control panel 214 and a power cord 16. An optional cord storage box 18 may be used as previously described with respect to the embodiment of the invention shown in FIG. 1. The safety circuit panel 206 is coupled to grid power through power supply cord 20', which provides electricity into the panel 206. Safety circuit panel 206 is connected to remote control panel 214 by control cord 220 for the purpose of connection to a power conductor, such as one or more wires of power cord 16. In the example usage represented in FIG. 15, the safety circuit panel 206 may be used to supply power to an engine of refrigeration unit 22 of the trailer 12.

Figure 24:
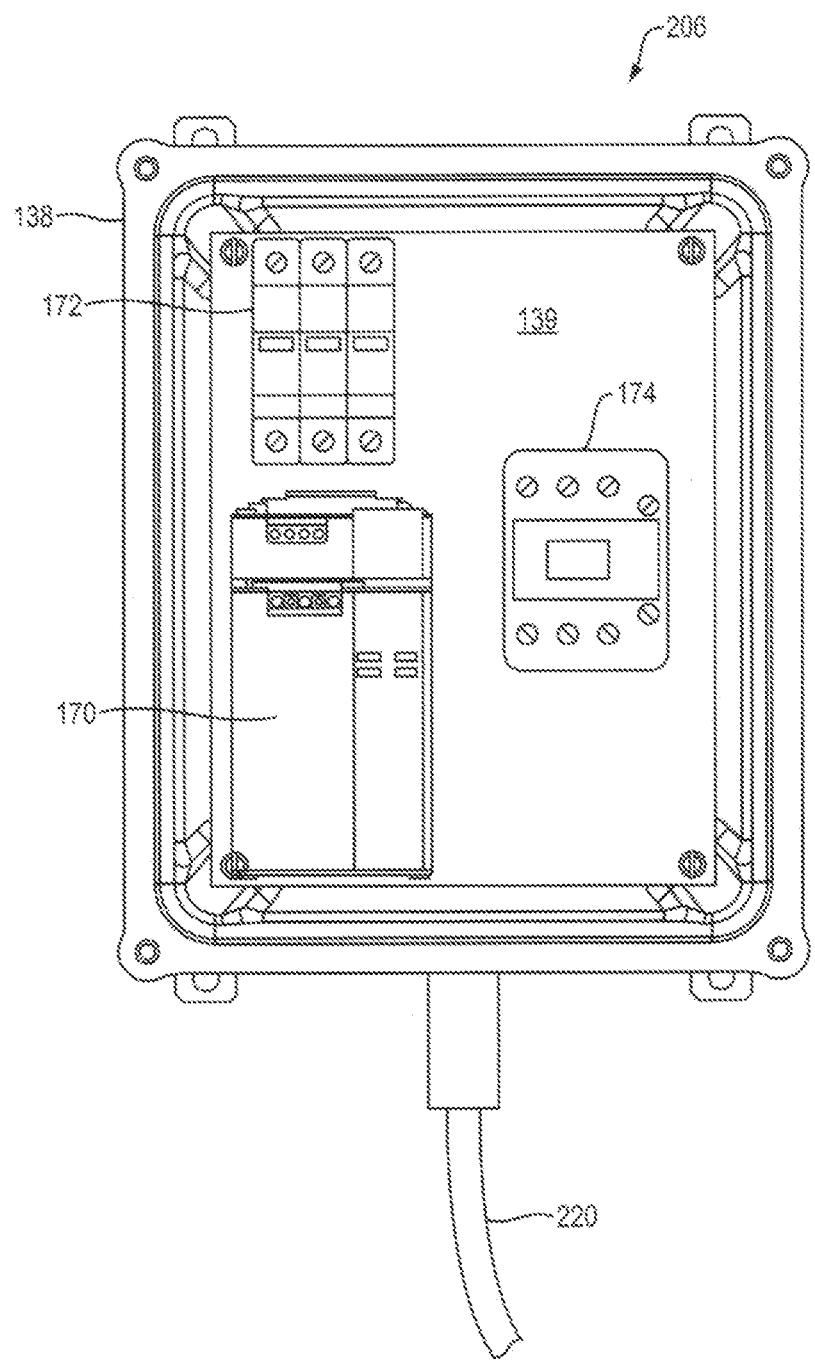
FIG. 24 is a simplified block diagram showing a portion of the safety circuitry for the single remote station embodiment of the invention.

The power cord 16 includes first end 26 for releasable connection to wall receptacle 28 of the remote control panel 214, which receives power from safety circuit panel 206 through control cord 220, and second end 30 to connect to the cable 32 that connects to a power supply receptor of the refrigeration unit 22. Alternatively, the second end 30 of the power cord 16 may connect directly to the refrigeration unit 22. The first end 26 and the wall receptacle 28 must be properly aligned and completely engaged as previously described to generate power. The remote panel 214 can be placed in an area that is convenient for the system user. The remote panel 214 has stop and start buttons 210 and 212 operable in the manner previously described for the safety circuit panel 14 of FIG. 1. Components of the safety circuit panel 206 within the casement 138 joined to the back panel 139 are represented in FIG. 24. They include the 24VDC power supply 170, fuse holders 172 (including a primary fuse and a secondary fuse), and the 24VDC contactor 174 as previously described. The safety circuit panel 206 contains the same circuitry as shown in FIG. 13, except there is an added conduit, control cord 220, which connects the safety circuit panel 206 to the remote control panel 214. The remote control panel 214 contains the same circuitry as shown in FIG. 14. The circuit configuration of FIG. 24 may be used for the single remote station. It is to be understood that the power supply system 200 may be used to supply power to other types of systems, including mobile systems requiring power to one or more devices.

Figure 16:
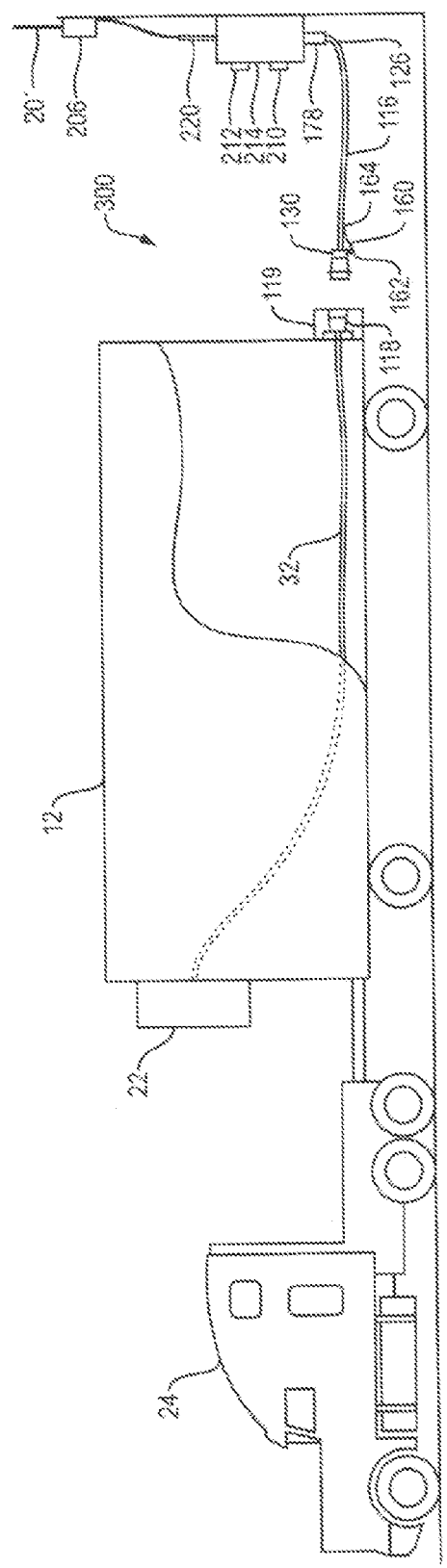
FIG. 16 is a side view of a simplified representation of a fourth embodiment of the power supply system of the present invention associated with a mobile structure in the form of a refrigerated trailer.
Figure 17:
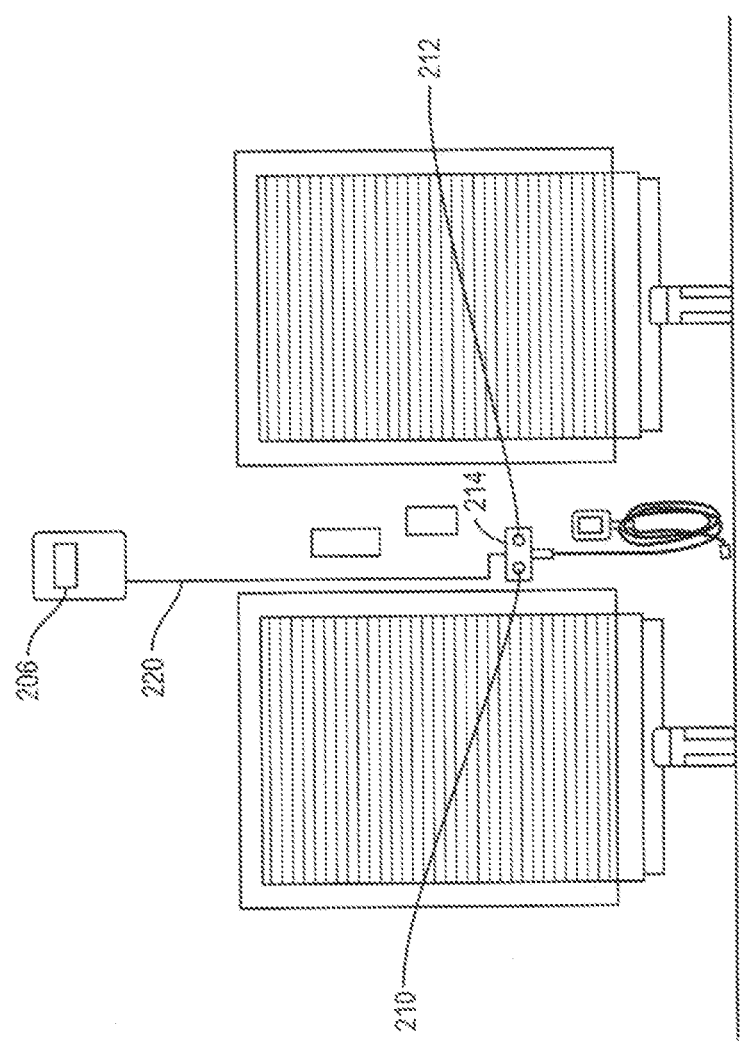
FIG. 17 is an end view of an embodiment of the power supply system of the present invention, showing a plurality of vehicles having access to the single remote docking station represented in FIGS. 15 and 16.

A power supply system 300 of a fourth embodiment of the present invention is shown associated with a refrigerated trailer 12 in FIGS. 16 and 17. The power supply system 300 includes safety circuit panel 206, remote control panel 214, power cord 116 and power plug 118 that may be contained in containment box 119 as previously shown in FIG. 7. The length of the power cord 116 is selectable. The power plug 118 is configured to ensure that current moves to the trailer 12 when it and the power cord 116 are aligned and connected in the specific way previously described. The safety circuit panel 206 is coupled to grid power through panel cord 20', which provides electricity into the panel 206. The safety circuit panel 206 for this embodiment of the invention may be the same as the safety circuit panel 206 shown in FIG. 24. The safety circuit panel 206 is connected to remote control panel 214 by control cord 220 for the purpose of connection to a power conductor, such as one or more wires of the power cord 116. The remote panel 214 can be placed in an area that is convenient for the system user as shown in FIG. 17 but with the safety circuitry spaced away from easy access by system users. The remote panel 214 has stop and start buttons 210 and 212. The remote panel 214 has a power cord port 178 for engaging with power cord 116 as previously described with respect to the embodiment of the invention shown in FIG. 7. In the example represented in FIG. 16, the safety circuit panel 206 connected to the remote panel 214 by control cord 220 may be used to supply power to an engine of the refrigeration unit 22 of the trailer 12 through cable 32. In this example, the refrigeration unit 22 may be operated to keep the contents of the trailer 12 temperature controlled using grid power rather than power from the engine of the refrigeration unit 22.

Figure 18:
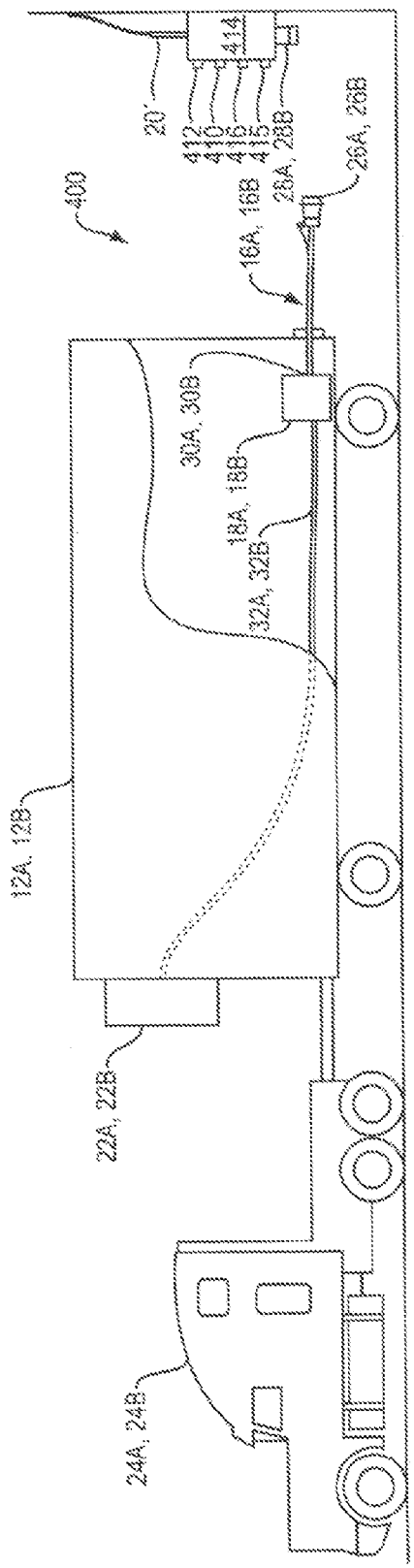
FIG. 18 is a side view of a simplified representation of a fifth embodiment of the power supply system of the present invention associated with a mobile structure in the form of a refrigerated trailer.

It is contemplated that the various embodiments of the present invention may be operable in forms allowing for power supply to a plurality of devices, such as a plurality of refrigerated trucks. A first example of this form of the invention is a power supply system 400 of a fifth embodiment of the present invention is shown associated with refrigerated trailers 12A and 12B in FIG. 18. Herein all referenced numbers with a letter designation (i.e. "A" or "B") after them are connected to those with the same letter after them within the system 400. The power supply system 400 includes a safety circuit panel 414 and power cords 16A and 16B. Optional cord storage boxes 18A and 18B may be used as previously described. The safety circuit panel 414 is coupled to grid power through power supply cord 20', which provides electricity into the panel 414. In the example usage represented in FIG. 18, the circuit panel 414 may be used to supply power to the engines of refrigeration units 22A and 2213 of the trailers 12A and 12B. In this way, the refrigeration units 22A and 22B may be operated to keep the contents of the trailers 12A and 1213 temperature controlled using grid power rather than power from the engine of the refrigeration units 22A and 22B.

Each of the power cords 16A and 16B includes a first end 26A and 2613, respectively, for releasable connection to their respective wall receptacles 28A and 28B of the circuit panel 414, and second ends 30A and 30B to connect to cables 32A and 321 that connect to power supply receptors of the refrigeration units 22A and 22B. Alternatively, the second ends 30A and 30B of the power cords 16A and 16B may connect directly to the refrigeration units 22A and 22B. The first end of 26A and 26B and their respective wall receptacles 28A and 28B must be properly aligned and completely engaged as previously described to ensure power is available to the trailers 12A and 12B. Of course, only one of trailers 12A and 12B may be powered if only one of the indicated connections is established. It is to be understood that the power supply system 400 may be used to supply power to other types of systems, including mobile systems requiring power at one or more locations.

Figure 20:
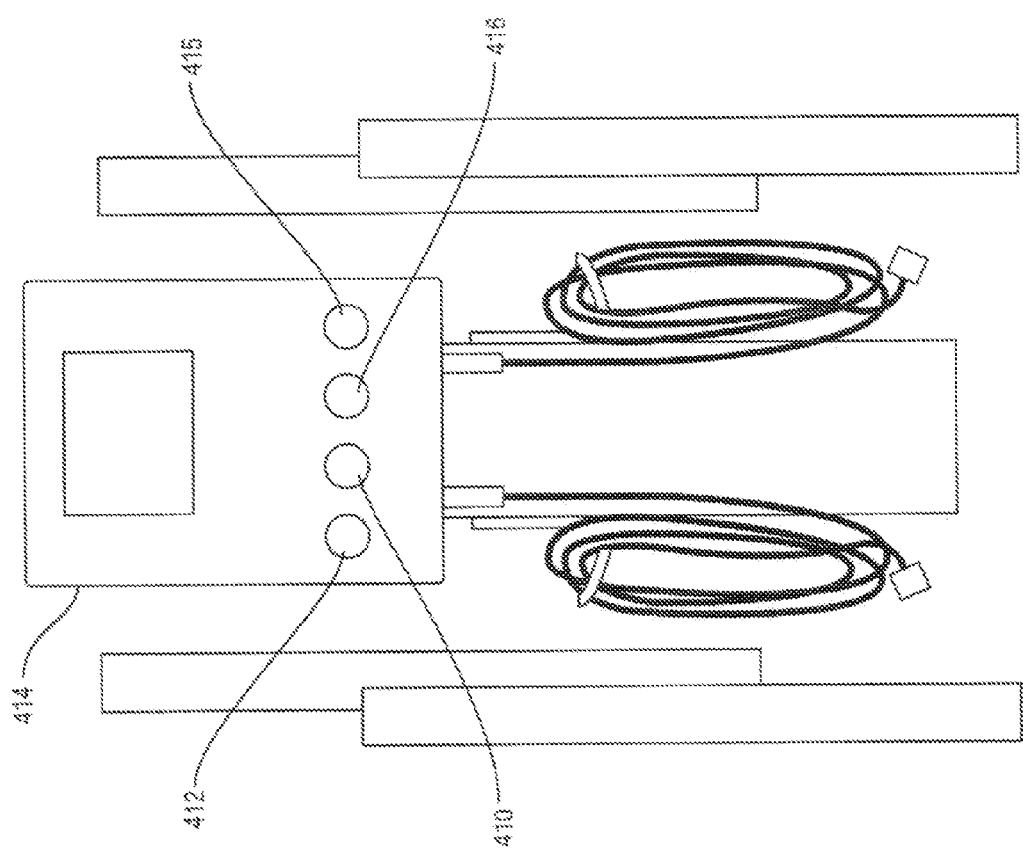
FIG. 20 is an end view of an embodiment of the power supply system of the present invention, showing a plurality of vehicles having access to the double docking station represented in FIGS. 18 and 19.
Figure 25:
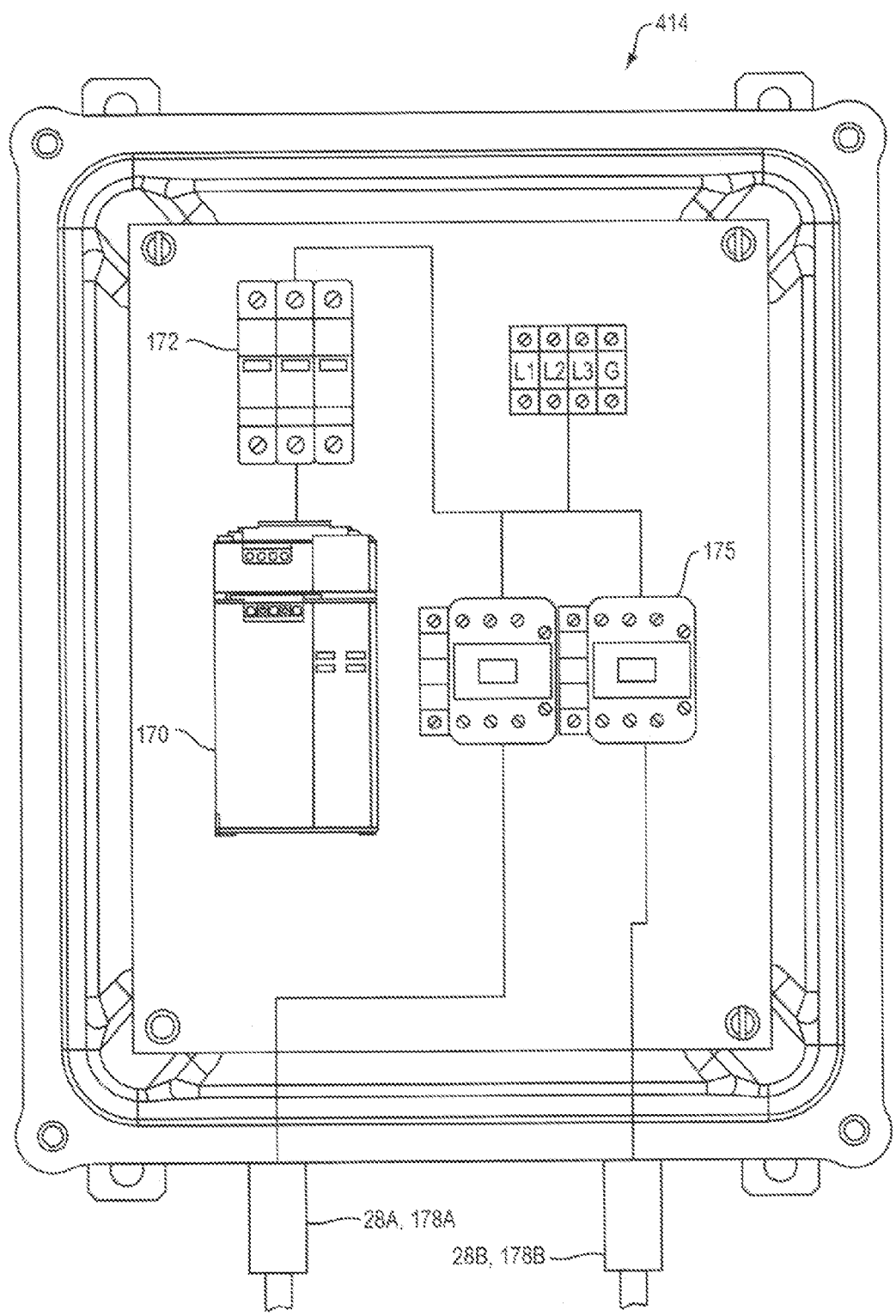
FIG. 25 is a simplified block diagram showing a portion of the safety circuitry for the double station embodiment of the invention.

The safety circuit panel 414 includes first stop and start buttons 410 and 412, and second stop and start buttons 415 and 416 as shown in FIG. 20. Components of the safety circuit panel 414 suitable for the embodiments of the invention involving two or more power supply outlets are represented in FIG. 25. The safety circuit panel 414 is within the casement 138 and joined to the back panel 139. It includes the 24VDC power supply 170, fuse holders 172 (including a primary fuse and a secondary fuse) and one or more 24VDC contactors 175 with enough contacts for the wiring necessary to permit for this particular embodiment current to travel to power cords 16A and 16B when the first ends thereof and the wall receptacles 28A and 28B are properly aligned and completely engaged as previously described to generate power. The circuitry of the safety circuit panel 414 is coupled to the power cords 16A and 16B through the wall receptacles 28A and 28B. The safety circuit panel 414 contains the indicated circuitry for wall receptacles 28A and 28B so that the safety circuit panel 414 may supply power to a plurality of devices, such as refrigeration units 22A and 22B of tractors 12A and 12B. It is to be understood that while the present description is specific concerning the number circuits, panels and wires the power supply system of the present invention may use a different number of circuits, panels and wires without deviating from the invention.

Figure 19:
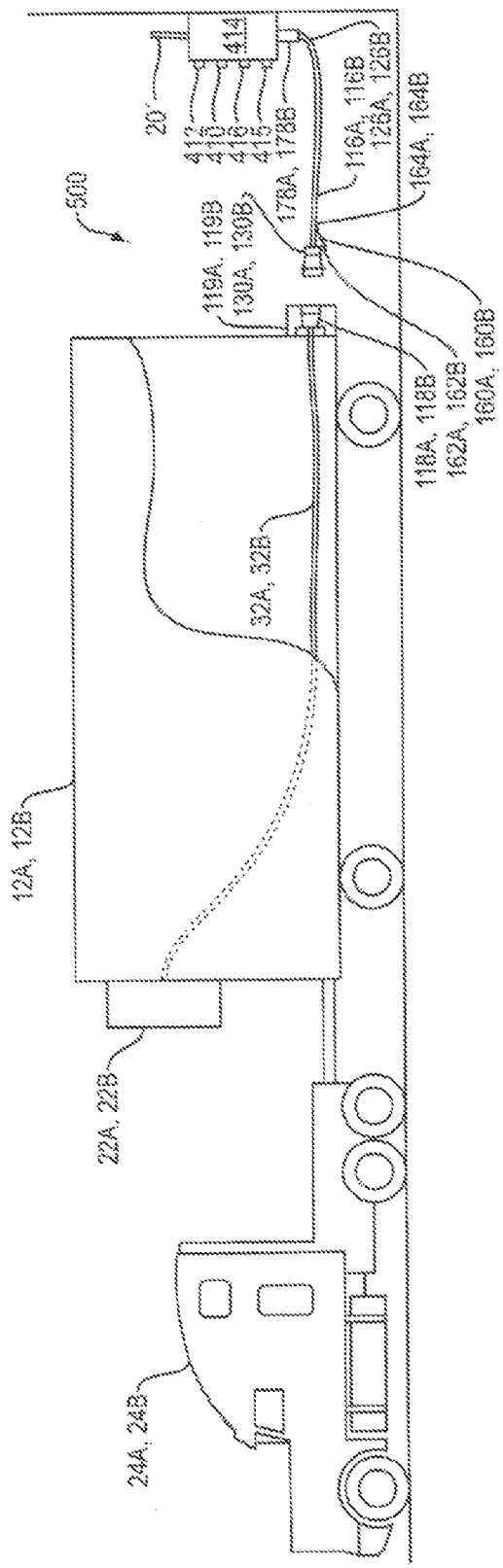
FIG. 19 is a side view of a simplified representation of a sixth embodiment of the power supply system of the present invention associated with a mobile structure in the form of a refrigerated trailer.

A power supply system 500 of a sixth embodiment of the present invention for powering a plurality of devices is shown associated with refrigerated trailers 12A and 12B in FIG. 19. The power supply system 500 includes the safety circuit panel 414, power cords 116A and 116B, and power plugs 118A and 118B that may be contained in containment boxes 119A and 119B, such as the containment box of FIG. 7. The lengths of the power cords 116A and 116B are selectable. The power plugs 118A and 118B are configured to ensure that current moves to the trailers 12A and 12B when they and the power cords 116A and 116B are aligned and connected in the manner previously described. The trailers 12A and 12B may include optional cord storage boxes 18A and 18B. The safety circuit panel 414 is coupled to grid power through power supply cord 20', which provides electricity into the panel 414 for the purpose of connection to a power conductor, such as one or more wires of power cords 116A and 116B. The safety circuit panel 414 includes first stop and start buttons 410 and 412, and second stop and start buttons 415 and 416 as shown in FIGS. 19 and 20. The safety circuit panel 414 is within the casement 138 and joined to the back panel 139. It includes the 24VDC power supply 170, fuse holders 172 (including a primary fuse and a secondary fuse), and one or more 24VDC contactors 175 with enough contacts for the wiring necessary to permit current to travel to the power cord ports 178A and 178B and their respective attached power cords 116A and 116B when the six-pinholes of six-pinhole face 150 are aligned and engaged with the six-pin power plug 118. The circuitry of the safety circuit panel 414 is coupled to the power cords 116A and 116B through the ports 178A and 178B. The safety circuit panel 414 contains the indicated circuitry for power cord ports 178A and 178B and their respective attached power cords 116A and 116B so that the safety circuit panel 414 may supply power to a plurality of devices, such as refrigeration units 22A and 22B of tractors 12A and 12B.

Figure 21:
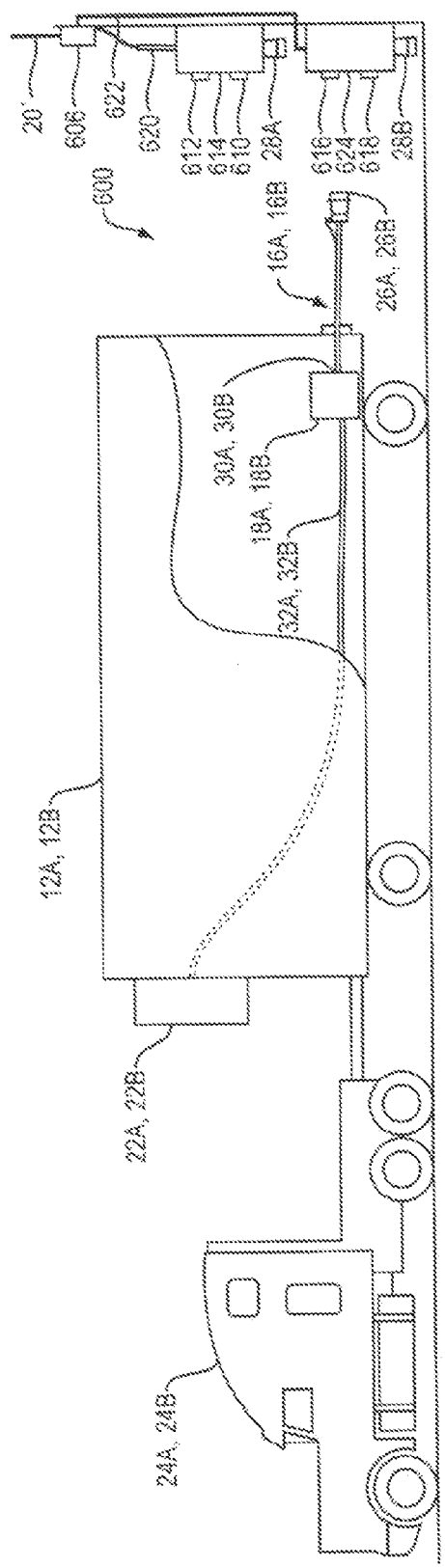
FIG. 21 is a side view of a simplified representation of a seventh embodiment of the power supply system of the present invention associated with a mobile structure in the form of a refrigerated trailer.
Figure 26:
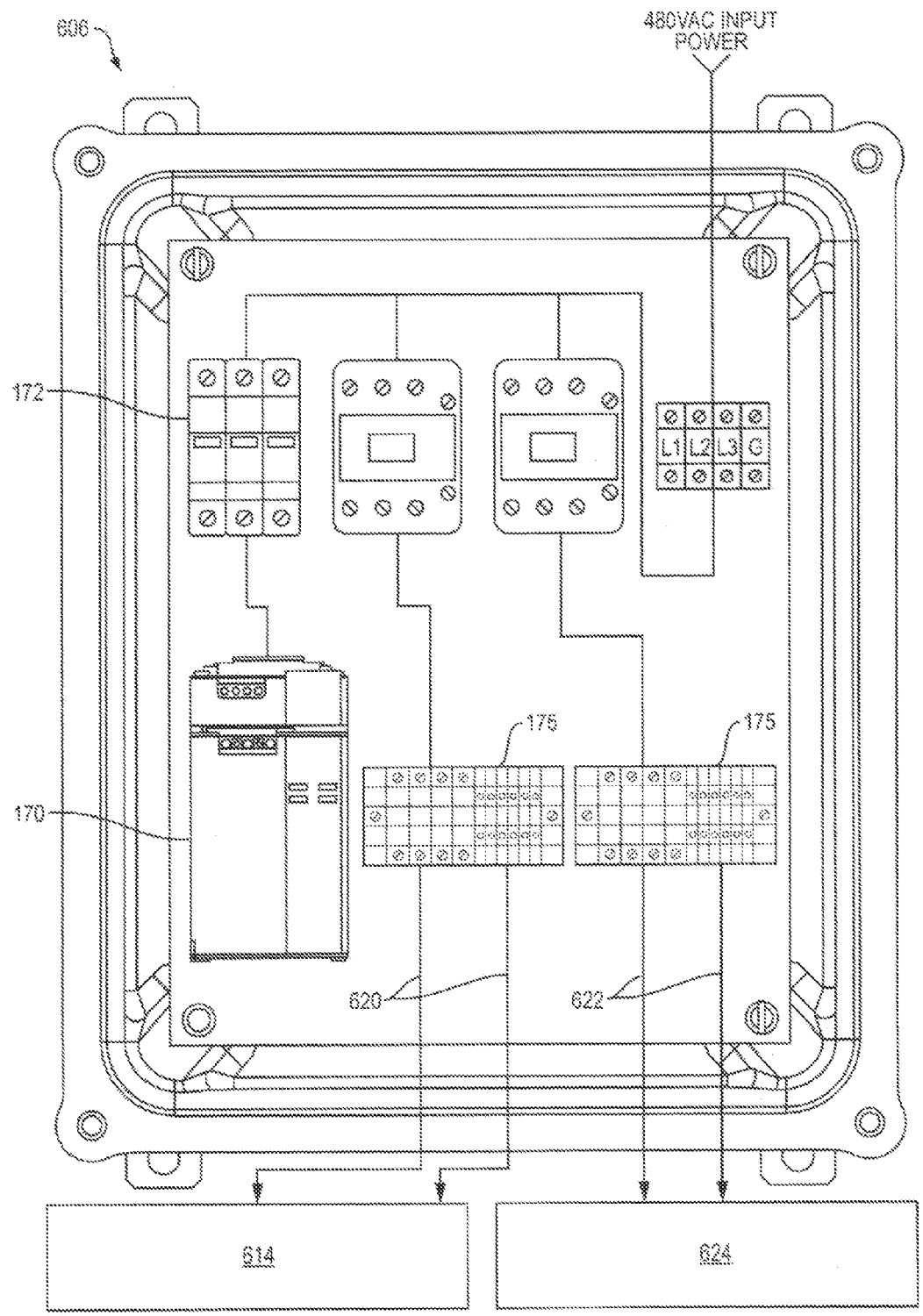
FIG. 26 is a simplified block diagram showing a portion of the safety circuitry for the remote double station embodiment of the invention.

A power supply system 600 of a seventh embodiment of the present invention is shown associated with refrigerated trailer 12A and 12B in FIG. 21. The power supply system 600 includes a safety circuit panel 606, remote control panels 614 and 624, power cords 16A and 16B, and optional cord storage boxes 18A and 18B. The safety circuit panel 606 is coupled to grid power through power supply cord 20', which provides electricity into the panel 606. The safety circuit panel 606 is connected to remote control panels 614 and 624 through control cords 620 and 622, respectively. Components of the safety circuit panel 606 are also represented in FIG. 26. The safety circuit panel 606 is contained within the casement 138 and joined to the back panel 139. The safety circuit panel 606 includes a 24VDC power supply 170, fuse holders 172 (including a primary fuse and a secondary fuse), and one or more 24VDC contactors 175 with enough contacts for the wiring necessary to permit current to travel through control cords 620 and 622 to their respective remote control panels 614 and 624 and their respective power cords 16A and 16B when their respective first ends 26A and 26B and their respective wall receptacles 28A and 26B are properly aligned and completely engaged as previously described. The safety circuit panel 606 and the remote control panels 614 and 624 contain circuitry shown in combination in FIG. 27, which is similar to the circuitry described and represented in FIG. 13. In the example usage represented in FIG. 21, the circuit panel 606 may be used to supply power through remote panels 614 and 624 to engines of refrigeration units 22A and 22B of the trailers 12A and 12B. In this way, the refrigeration units 22A and 22B may be operated to keep the contents of the trailers 12A and 12B temperature controlled using grid power rather than power from the engine of the refrigeration units 22A and 22B.

Each of the power cords 16A and 1613 includes a first end 26A and 26B, respectively, for releasable connection to their respective wall receptacles 28A and 28B of the remote panels 614 and 624, and second ends 30A and 30B to connect to cables 32A and 32B that connect to a power supply receptor of the refrigeration units 22A and 22B. Alternatively, the second ends 30A and 30B of the power cords 16A and 16B may connect directly to the refrigeration units 22A and 22B. It is to be understood that the power supply system 600 may be used to supply power to other types of systems, including mobile systems requiring power at one or more locations. The power cords 16A and 16B must be coupled to the wall receptacles 28A and 28B, respectively, by proper alignment and complete engagement, as previously described, to ensure power is provided to trailers 12A and 12B. Of course, power may be supplied to only one trailer if that is all that is required, provided the engagement is established fir the remote to which that trailer is engaged.

Figure 23:
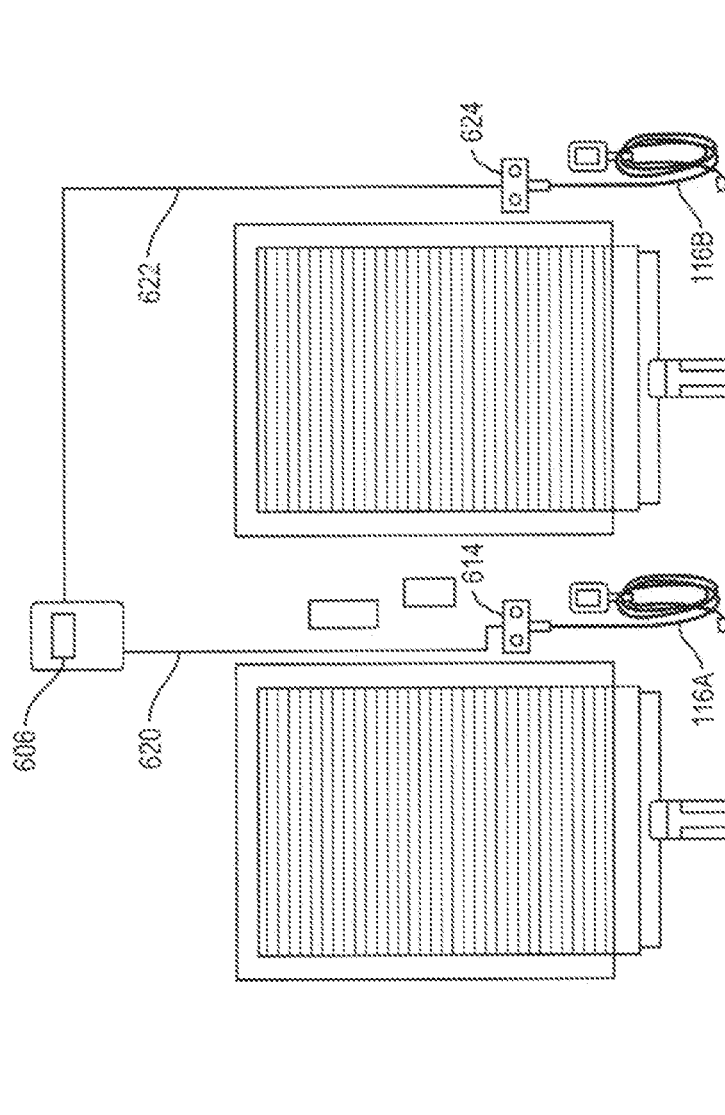
FIG. 23 is an end view of an embodiment of the power supply system of the present invention, showing a plurality of vehicles having access to the double remote docking station represented in FIGS. 21 and 22.

The remote panels 614 and 624 can be placed in an area that is convenient for the system user as shown in FIG. 23 but with the safety circuitry spaced away from easy access by system users. The remote panel 614 has stop and start buttons 610 and 612, and the remote panel 624 has stop and start buttons 616 and 618. The remote panels 614 and 624 each have a power cord port 178A and 178B with a power cord 116A and 116B, respectively, so that each panel 614 and 624 may supply power to refrigeration units 22A and 22B of tractors 12A and 12B. The safety circuit panel 606 includes two separate circuits, one each for remote panels 614 and 624.

Figure 22:
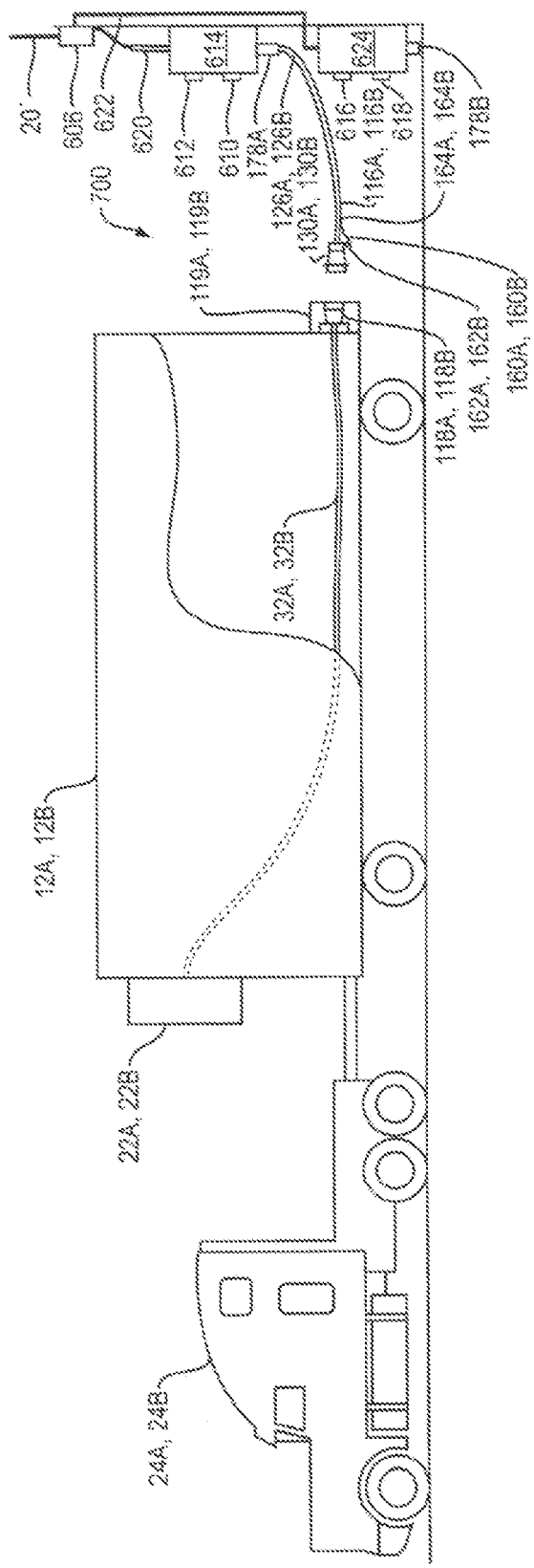
FIG. 22 is a side view of a simplified representation of an eighth embodiment of the power supply system of the present invention associated with a mobile structure in the form of a refrigerated trailer.

A power supply system 700 of an eighth embodiment of the present invention is shown associated with a refrigerated trailers 12A and 12B in FIG. 22. The power supply system 700 includes a safety circuit panel 606, remote control panels 614 and 624, power cords 116A and 116B, and power plugs 118A and 118B that may be contained in containment boxes 119A and 119B, an example of which is shown in FIG. 7. The lengths of the power cords 116A and 116B are selectable. The power plugs 118A and 118B are configured to ensure that power is provided to the trailers 12A and 12B when they and the power cords 116A and 116B are properly aligned and completely connected as previously described. The trailers 12A and 12B may include optional cord storage boxes 18A and 18B.

Figure 27:
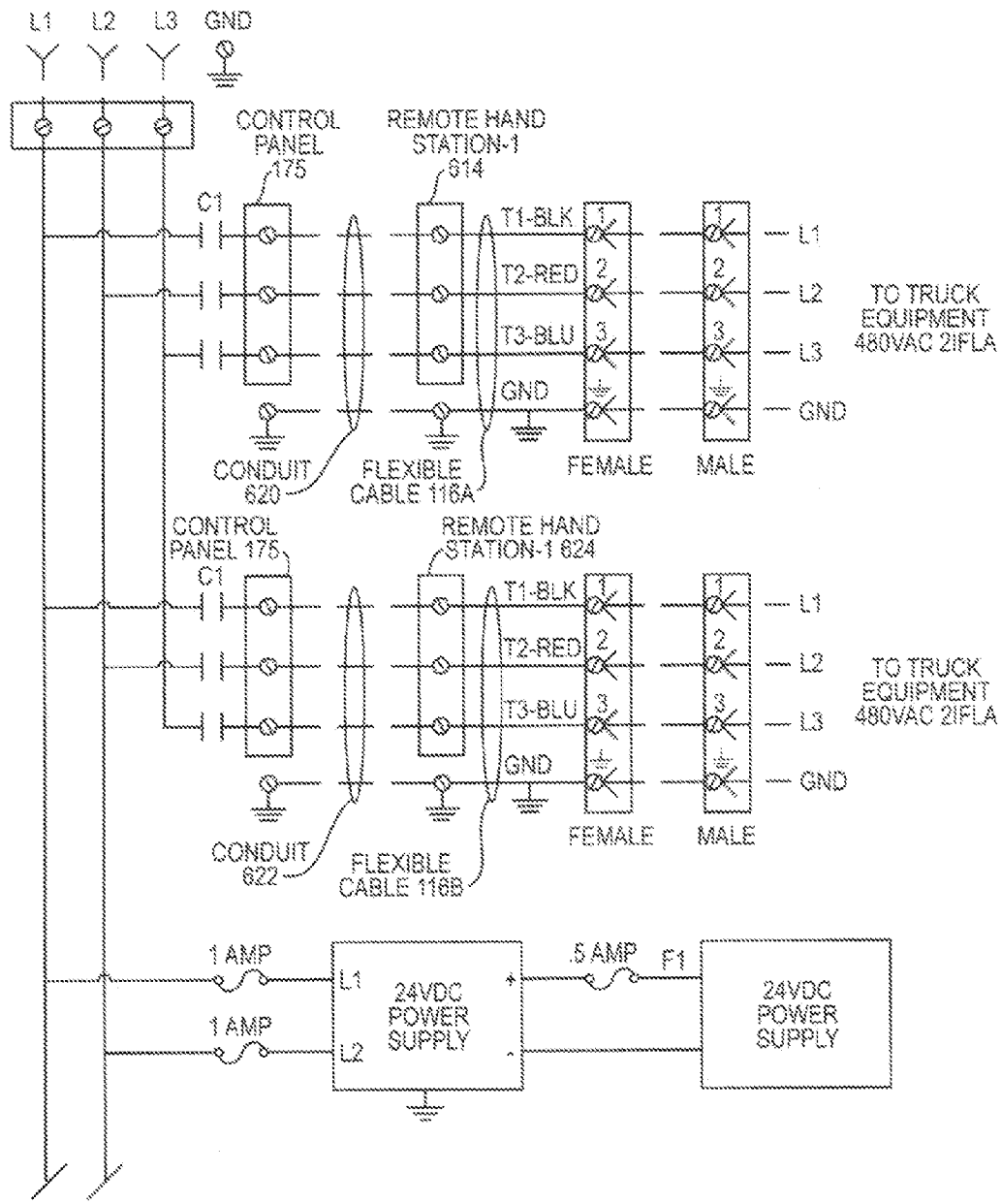
FIG. 27 is a circuit diagram of the safety circuitry for the remote double station embodiment of the invention.

The safety circuit panel 606 is coupled to grid power through power supply cord 20', which provides electricity into the panel 606. The safety circuit panel 606 shown in FIG. 25 is suitable for this specific embodiment of the invention, within the casement 138 joined to the back panel 139 a 24VDC power supply 170, fuse holders 172 including a primary fuse and a secondary fuse, and one or more 24VDC contactors 174 with enough contacts for the wiring necessary to permit current to travel through control cords 620 and 622 to their respective remote control panels 614 and 624 and their respective attached power cords 116A and 116B when each of the six-pinholes of six-pinhole faces 150 are aligned and engaged with each of the six-pin power plugs 118. The safety circuit panel 606 and the remote control panels 614 and 624 contain circuitry in combination as shown in FIG. 27, which is, in effect, a doubling of the circuitry described and shown in FIG. 13. The safety circuit panel 606 is connected to remote control panels 614 and 624 through panel cords 620 and 622, respectively, for the purpose of connection to a power conductor, such as one or more wires of power cords 116A and 116B. In the example usage represented in FIG. 22, the safety circuit panel 606 may be used to supply power through remote panels 614 and 624 to an engine of the refrigeration units 22A and 22B of trailers 12A and 12B through cables 32A and 32B. In this way, the refrigeration units 22A and 22B may be operated to keep the contents of trailers 12A and 12B temperature controlled using grid power rather than power from the engine of the refrigeration units 22A and 22B.

The power supply system 700 embodiment of the present invention has two remote panels 614 and 624 that can be placed in an area that is convenient for the system user as shown in FIG. 23 but with the safety circuitry spaced away from easy access by system users. The remote panel 614 has stop and start buttons 610 and 612, and remote panel 624 has stop and start buttons 616 and 618. The remote panels 614 and 624 each have a power cord port 178A and 178B with a power cord 116A and 116B, respectively, so that each panel may supply power to refrigeration units 22A and 22B of tractors 12A and 12B. The power supply system 700 has one safety circuit panel 606 including two separate circuits for each of the remote panels 614 and 624. It is to be understood that while the present description is specific concerning the number circuits, panels and wires the power supply system of the present invention may use a different number of circuits, panels and wires without deviating from the invention.

It is to be noted that the various embodiments represented in FIGS. 15-23 may include pin and pinhole configurations as previously described. Also, the present invention includes variations such as providing multiple power cords from a single safety circuit panel or a single remote panel.

The present invention has been described with respect to two embodiments. Nevertheless, it is to be understood that various modifications may be made without departing from the spirit and scope of the invention. All equivalents are deemed to fall within the scope of this description of the invention.

What is claimed is:

1. A power supply system comprising:
   a. a circuit panel arranged for connection to a power grid;
   b. one or more remote panels connected to the circuit panel, wherein each of the one or more remote panels includes a stop and a start button and
   c. one or more power cords for each remote panel, each power cord having a first end and a second end, wherein each first end is engaged with the power grid and each second end includes one or more pinhole faces with a plurality of pinholes, wherein the plurality of pinholes for each of the one or more power cords is configured for releasable engagement with a plurality of pins of a pin power plug,
   wherein each pin power plug is connectable to a device to be powered,
   wherein each of the one or more power cords is arranged to transfer power to the pin power plug only when the pins of the pin power plug and the pinholes of the power cord are aligned and engaged with one another,
   wherein a first portion of the plurality of pinholes of the power cord is arranged to supply current from the power grid to each of the one or more power cords when aligned and engaged with a first portion of the plurality of pins of the pin power plug,
   wherein a second portion of the plurality of pinholes of each of the one or more power cords is arranged to supply current from the corresponding power cord to the corresponding device when aligned and engaged with a second portion of the plurality of pins of the power plugs,
   wherein the circuit panel includes a safety circuit for each remote panel arranged to prevent current from the power grid to one or more of the power cords unless: 1) the first and second portions of the plurality of pinholes and the plurality of pins are aligned and engaged with one another; and 2) contacts of the safety circuit are moved from an open to an engaged position and the start button of the remote panel has been pushed, and
   wherein each power cord includes a safety ejection subsystem configured to cause disconnection of the second end of each power cord from the corresponding pin power plug when the two are connected together under tension loading of the connected power cord.

2. The system of claim 1, wherein the pinhole face has six pinholes and the pin power plug has six pins that are arranged fir alignment and connection with the six pinholes of the power cord.

3. The system of claim 1, wherein the safety circuit include one or more sensors arranged to sense a lack of contact between at least one of the plurality of pins and a corresponding one of the plurality of pinholes of either the first portion or the second portion and to block current from the power grid to the power cord when the lack of contact is sensed.

4. The system of claim 3, wherein the one or more sensors is a voltage meter connect across one or more wires of each power cord and one or more of the pins or pinholes or a current meter in line with one or more wires of each power cord.

5. The system of claim 1, wherein the safety ejection subsystem includes a latch connected to a housing of the second end of each power cord and a tension line connected to the latch and to each power cord.

6. The system of claim 5, wherein the tension line and the latch are made of steel.

7. The system of claim 1, wherein the second end of each power cord includes a sealing cover.

8. The system of claim 7, wherein the sealing cover is hinged.

9. The system of claim 1, wherein each remote panel is separate from the circuit panel and affixed to a convenient area for use.

10. The system of claim 9, wherein each remote panel is connected via hardwire to the circuit panel.

11. A power supply system comprising:
    a. a circuit panel arranged for connection to a power grid;
    b. one or more remote panels connected to the circuit panel, wherein each of the one or more remote panels includes a stop and start button and a wall receptacle with a pinhole face and a plurality of pinholes; and
    c. one or more power cords for each remote panel, each power cord having a first end and a second end, wherein each first end includes a plurality of pins for releasable engagement with the plurality of pinholes of the wall receptacle of the remote panel,
    wherein each second end of the power cord is connectable to a device to be powered,
    wherein the pinhole face of the wall receptacle and the first end of each power cord are arranged to transfer power only when the plurality of pins of the power cord and the plurality of pinholes of the receptacle are aligned and engaged with one another,
    wherein each power cord is arranged to transfer power to the device only when the plurality of pins of the power cord and the plurality of pinholes of the wall receptacle are aligned and engaged with one another,
    wherein a first portion of the plurality of pins of the power cord is arranged to receive current when aligned and engaged with a first portion of the plurality of pinholes of the wall receptacle,
    wherein a second portion of the plurality of pins of the power cord is arranged to supply current to the corresponding device when aligned and engaged with a second portion of the plurality of pinholes of the wall receptacle,
    wherein the circuit panel includes a safety circuit for each remote panel arranged to prevent current from the power grid to one or more of the power cords unless: 1) the first and second portions of the plurality of pinholes and the plurality of pins are aligned and engaged with one another, and 2) contacts of the safety circuit are moved from an open to an engaged position and the start button of the remote panel has been pushed, and
    wherein each power cord includes a safety ejection subsystem configured to cause disconnection of the second end of each power cord from the corresponding pin power plug when the two are connected together under tension loading of the connected power cord.

12. The system of claim 11, wherein the pinhole face of the receptacle has six pinholes and the power cord has six pins that are arranged for alignment and connection with the six pinholes of the receptacle.

13. The system of claim 11, wherein the safety circuit(s) includes one or more sensors arranged to sense a lack of contact between at least one of the plurality of pins and a corresponding one of the plurality of pinholes of either the first portion or the second portion and to block current from the power grid to the power cord when the lack of contact is sensed.

14. The system of claim 13, wherein the one or more sensors is a voltage meter connect across one or more wires of each power cord and one or more of the pins or pinholes or a current meter in line with one or more wires of each power cord.

15. The system of claim 11, wherein the safety ejection subsystem includes a latch connected to a housing of the first end of each power cord and a tension line connected to the latch and to each power cord.

16. The system of claim 15, wherein the tension line and the latch are made of steel.

17. The system of claim 11, wherein the first end of each power cord includes a sealing cover.

18. The system of claim 17, wherein the sealing cover is hinged.

19. The system of claim 11, wherein each remote panel is separate from the circuit panel and affixed to a convenient area for use.

20. The system of claim 19, wherein each remote panel is connected via hardwire to the circuit panel.

* * * * *